US011417050B2

(12) United States Patent
Himukashi

(10) Patent No.: US 11,417,050 B2
(45) Date of Patent: Aug. 16, 2022

(54) IMAGE ADJUSTMENT DEVICE, VIRTUAL REALITY IMAGE DISPLAY SYSTEM, AND IMAGE ADJUSTMENT METHOD

(71) Applicant: JVCKENWOOD Corporation, Yokohama (JP)

(72) Inventor: Takashi Himukashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 55 days.

(21) Appl. No.: 17/118,117

(22) Filed: Dec. 10, 2020

(65) Prior Publication Data

US 2021/0192834 A1 Jun. 24, 2021

(30) Foreign Application Priority Data

Dec. 19, 2019 (JP) ............................ JP2019-229149
Dec. 19, 2019 (JP) ............................ JP2019-229157
Dec. 19, 2019 (JP) ............................ JP2019-229164
Dec. 19, 2019 (JP) ............................ JP2019-229175
Dec. 19, 2019 (JP) ............................ JP2019-229178
Dec. 19, 2019 (JP) ............................ JP2019-229188

(51) Int. Cl.
*G06T 15/20* (2011.01)
*H04N 13/156* (2018.01)
(Continued)

(52) U.S. Cl.
CPC .......... *G06T 15/20* (2013.01); *G02B 27/0093* (2013.01); *G02B 27/0172* (2013.01);
(Continued)

(58) Field of Classification Search
CPC ..... G06T 15/20; G06T 3/4038; G06T 19/006; G06T 19/00; G06T 3/60; G02B 27/0093; G02B 27/0172; G02B 2027/014; G02B 2027/0138; G06F 3/014; H04N 13/156; H04N 13/194; H04N 21/2187; H04N 21/23614; H04N 21/25841;
(Continued)

(56) References Cited

U.S. PATENT DOCUMENTS

2016/0267720 A1* 9/2016 Mandella ............... H04N 5/232
2018/0048816 A1* 2/2018 Anderson ............ G06T 1/0007

FOREIGN PATENT DOCUMENTS

JP 2005-56295 A 3/2005
JP 2005056295 A * 3/2005

* cited by examiner

*Primary Examiner* — Jitesh Patel
(74) *Attorney, Agent, or Firm* — Nath, Goldberg & Meyer; Jerald L. Meyer

(57) ABSTRACT

A region image extractor extracts a region image from an omnidirectional image or a superimposed image obtained by superimposing a sphere image on the omnidirectional image. An image rotation unit corrects the tilt of the horizontal plane of the omnidirectional image by rotating the omnidirectional image through an operation to rotate the sphere image while the region image of the superimposed image is displayed on the head-mounted display. A vanishing point detector detects a vanishing point of the omnidirectional image. A front setting unit determines the front of the omnidirectional image based on the vanishing point and rotates the omnidirectional image so that the front of the omnidirectional image corresponds to the region image extracted when the user is facing forward.

16 Claims, 18 Drawing Sheets

(51) Int. Cl.

| | |
|---|---|
| ***H04N 13/194*** | (2018.01) |
| ***G02B 27/00*** | (2006.01) |
| ***G06T 19/00*** | (2011.01) |
| ***G02B 27/01*** | (2006.01) |
| ***G06T 3/40*** | (2006.01) |
| ***G06F 3/01*** | (2006.01) |

(52) U.S. Cl.
CPC ............ *G06F 3/014* (2013.01); *G06T 3/4038* (2013.01); *G06T 19/006* (2013.01); *H04N 13/156* (2018.05); *H04N 13/194* (2018.05); *G02B 2027/014* (2013.01)

(58) Field of Classification Search
CPC ......... H04N 21/4131; H04N 21/41422; H04N 21/4223; H04N 21/816; H04N 5/23238; H04N 7/18; H04N 13/243; H04N 13/344; H04N 21/2743; H04N 21/42222
See application file for complete search history.

IMAGE ADJUSTMENT DEVICE, VIRTUAL REALITY IMAGE DISPLAY SYSTEM, AND IMAGE ADJUSTMENT METHOD

CROSS REFERENCE TO RELATED APPLICATION

This application is based upon and claims the benefit of priority under 35 U.S.C. § 119 from Japanese Patent Application No. 2019-229149 filed on Dec. 20, 2019, Japanese Patent Application No. 2019-229157 filed on Dec. 20, 2019, Japanese Patent Application No. 2019-229164 filed on Dec. 20, 2019, Japanese Patent Application No. 2019-229175 filed on Dec. 20, 2019, Japanese Patent Application No. 2019-229178 filed on Dec. 20, 2019, and Japanese Patent Application No. 2019-229188 filed on Dec. 20, 2019, the entire contents of all of which are incorporated herein by reference.

BACKGROUND

The present disclosure relates to an image adjustment device, a virtual reality image display system, and an image adjustment method.

Virtual-reality image display systems are rapidly becoming popular. Such a virtual-reality image display system displays an omnidirectional image of view in all horizontal and vertical directions captured with an omnidirectional camera (a 360-degree camera) on a head-mounted display. The term "virtual-reality" is sometimes abbreviated as VR below.

SUMMARY

Japanese Unexamined Patent Application Publication No. 2005-56295 describes that the horizontal plane of an image captured with an omnidirectional camera is detected to correct the tilt of the image. The omnidirectional camera sometimes detects a horizontal plane of the captured image, attaches auxiliary information indicating the horizontal plane to an image signal, and outputs the image signal with the auxiliary signal.

Such an omnidirectional camera could detect incorrect horizontal planes in some captured images and attach incorrect auxiliary information to image signals. In the case of using a three-axis accelerometer to detect a horizontal plane of an image, the created auxiliary information indicates an incorrect horizontal plane in some cases. When the VR image display system displays the omnidirectional image captured with the omnidirectional camera, incorrect auxiliary information attached to the image signal produces a difference between the direction of gravity sensed by the user wearing the head-mounted display and the direction of the zenith of the omnidirectional image. This gives the user an uncomfortable feeling.

When the omnidirectional camera creates an omnidirectional image while moving, the front of the subject captured by the omnidirectional camera needs to correspond to an image to be displayed on the head-mounted display when the user is facing forward.

A first aspect of one or more embodiments provides an image adjustment device including: an image generator configured to generate a sphere image; a region image extractor configured to extract a region image according to a direction a user wearing a head-mounted display is facing, from an omnidirectional image of a subject captured with an omnidirectional camera disposed on a moving body or a superimposed image obtained by superimposing the sphere image on the omnidirectional image, and to supply the extracted region image to the head-mounted display; an image rotation unit configured to correct the tilt of a horizontal plane of the omnidirectional image by rotating the omnidirectional image through an operation to rotate the sphere image while the region image of the superimposed image extracted by the region image extractor is displayed on the head-mounted display; a vanishing point detector configured to detect a vanishing point of the omnidirectional image when the moving body is moving and the omnidirectional image is changing; and a front setting unit configured to determine the front of the omnidirectional image based on the vanishing point, and to rotate the omnidirectional image while maintaining the horizontal plane corrected by the image rotation unit so that the front of the omnidirectional image corresponds to the region image extracted when the user is facing forward.

A second aspect of one or more embodiments provides a virtual reality image display system including: a communication unit configured to receive from an image transmission server image data of an omnidirectional image of a subject captured with an omnidirectional camera disposed on a moving body and an acceleration detection signal detected by an accelerometer attached to the moving body or the omnidirectional camera; a head-mounted display which is worn on the head of a user, and configured to display the omnidirectional image to the user; a controller which is operated by the user; a chair in which the user sits; an image generator configured to generate a sphere image; an image superimposition unit configured to superimpose the sphere image on the omnidirectional image to generate a superimposed image; a region image extractor configured to extract a region image from the omnidirectional image or the superimposed image according to a direction the user is facing, and to supply the extracted region image to the head-mounted display; an image rotation unit configured to correct the tilt of the horizontal plane of the omnidirectional image by rotating the superimposed image through the user operating the controller to rotate the sphere image while sitting in the chair; a vanishing point detector configured to detect a vanishing point of the omnidirectional image when the moving body is moving and the omnidirectional image is changing; and a front setting unit configured to determine the front of the omnidirectional image based on the vanishing point, and to rotate the omnidirectional image while maintaining the horizontal plane corrected by the image rotation unit so that the front of the omnidirectional image corresponds to the region image extracted when the user is facing forward.

A third aspect of one or more embodiments provides an image adjustment method including: generating a sphere image; extracting a region image according to a direction a user wearing a head-mounted display faces, from an omnidirectional image of a subject captured with an omnidirectional camera disposed on a moving body or a superimposed image obtained by superimposing the sphere image on the omnidirectional image, and supplying the extracted region image to the head-mounted display; correcting the tilt of the horizontal plane of the omnidirectional image by rotating the omnidirectional image through an operation to rotate the sphere image while displaying the extracted region image of the superimposed image on the head-mounted display; detecting a vanishing point of the omnidirectional image when the moving body is moving and the omnidirectional image is changing; and determining the front of the omnidirectional image based on the vanishing point and rotating the omnidirectional image while maintaining the corrected horizontal plane so that the front of the omnidirectional image corresponds to the region image extracted when the user is facing forward.

DETAILED DESCRIPTION

The following describes an image adjustment device, a virtual reality image display system, an image adjustment method, and a method of controlling the virtual reality image display system according to each embodiment with reference to the accompanying drawings.

First Embodiment

Figure 1:
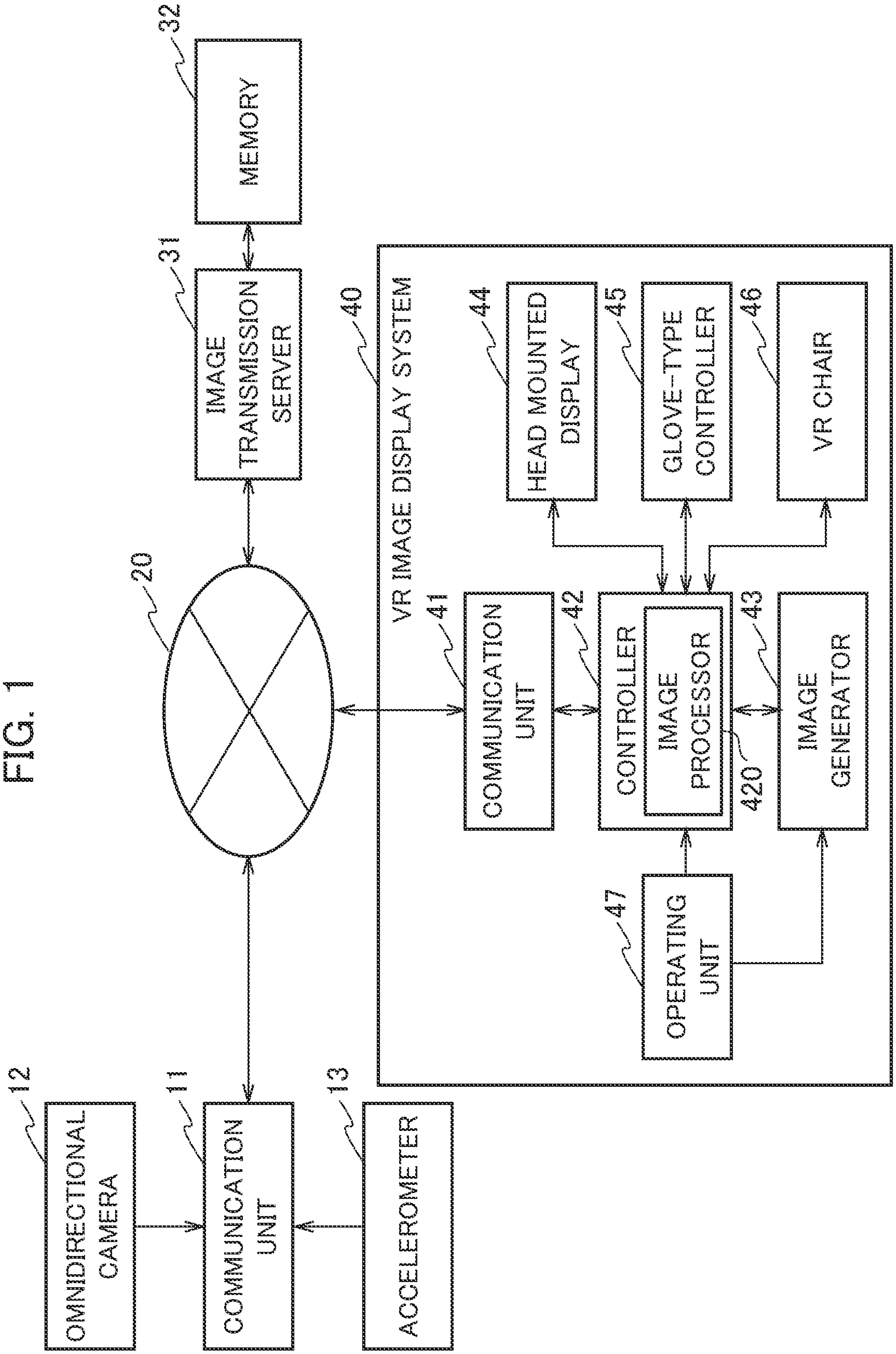
FIG. 1 is a block diagram illustrating an omnidirectional image transmission system including an image adjustment device and a virtual reality image display system according to each embodiment.
Figure 2:
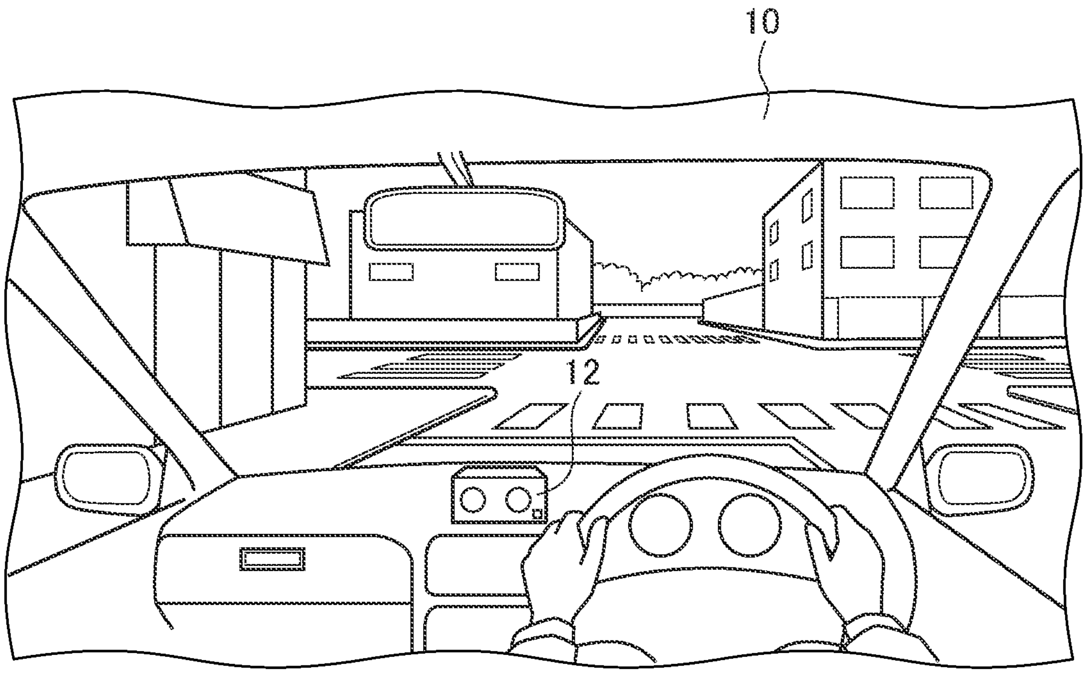
FIG. 2 is a partial perspective view illustrating a vehicle with an omnidirectional camera disposed inside.
Figure 3:
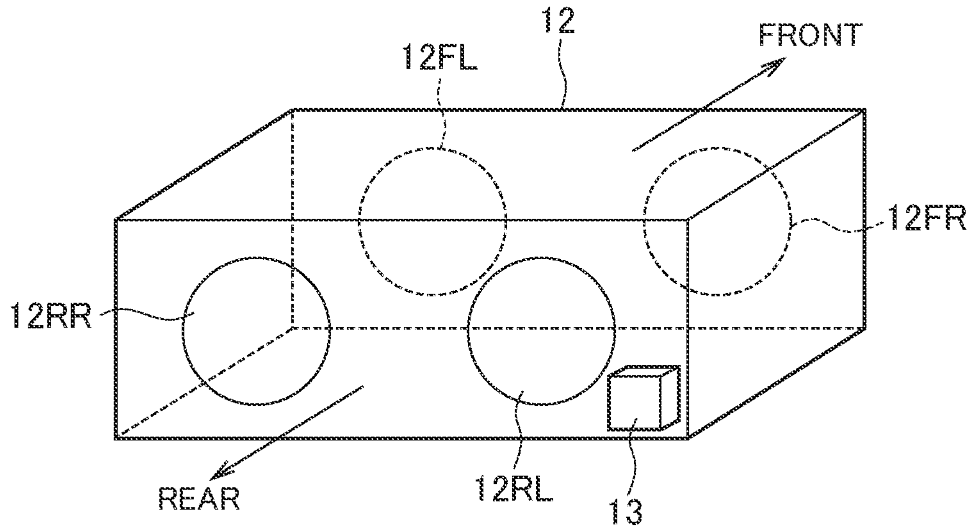
FIG. 3 is a perspective view illustrating an exterior configuration example of the omnidirectional camera.

In FIG. 1, a communication unit 11 connects to an omnidirectional camera 12 and a three-axis accelerometer 13. As illustrated in FIG. 2, the omnidirectional camera 12 is disposed on a dashboard of a vehicle 10 as an example. As illustrated in FIG. 3, the omnidirectional camera 12 disposed as illustrated in FIG. 2 includes: a fisheye lens 12FL for a left eye and a fisheye lens 12FR for a right eye to capture forward views from the vehicle 10; and a fisheye lens 12RL for a left eye and a fisheye lens 12RR for a right eye to capture rearward views from the vehicle 10.

The omnidirectional camera 12 may be disposed in front of a driver. The position of the omnidirectional camera 12 is not limited to inside the vehicle 10 and may be outside the vehicle 10, on the roof, for example. The omnidirectional camera 12 is disposed at any position of any moving body, such as the vehicle 10, and captures a relatively moving subject.

The accelerometer 13 is attached to the casing of the omnidirectional camera 12 as illustrated in FIG. 3. The accelerometer 13 may be disposed within the casing. Alternatively, the accelerometer 13 may be attached to the moving body on which the omnidirectional camera 12 is mounted. The omnidirectional camera 12 includes an image pick-up device, a video signal processing circuit, and other elements within its casing. The omnidirectional camera 12 creates a left-eye image signal and a right-eye image signal. The omnidirectional camera 12 thereby generates omnidirectional image data for three-dimensional (3D) display.

The omnidirectional camera 12 detects a horizontal plane of a captured image based on the same image, attaches auxiliary information indicating the detected horizontal plane to omnidirectional image data, and outputs the omnidirectional image data with the auxiliary information. The omnidirectional camera 12 may detect a horizontal plane of an image using a three-axis accelerometer. The omnidirectional camera 12 does not have to create the auxiliary information indicating a horizontal plane.

Returning to FIG. 1, the communication unit 11 supplies the omnidirectional image data generated by the omnidirectional camera 12 and an acceleration detection signal indicating acceleration detected by the accelerometer 13, to an image transmission server 31 via a network 20. The omnidirectional image data with the auxiliary information attached is simply referred to as omnidirectional image data below. Typically, the network 20 is the Internet.

A memory 32 temporarily stores the omnidirectional image data and acceleration detection signal supplied to the image transmission server 31. The image transmission server 31 transmits the omnidirectional image data and acceleration detection signal via the network 20 to a VR image display system 40 disposed on the client's side that receives delivery of the omnidirectional image data generated by the omnidirectional camera 12.

Figure 4:
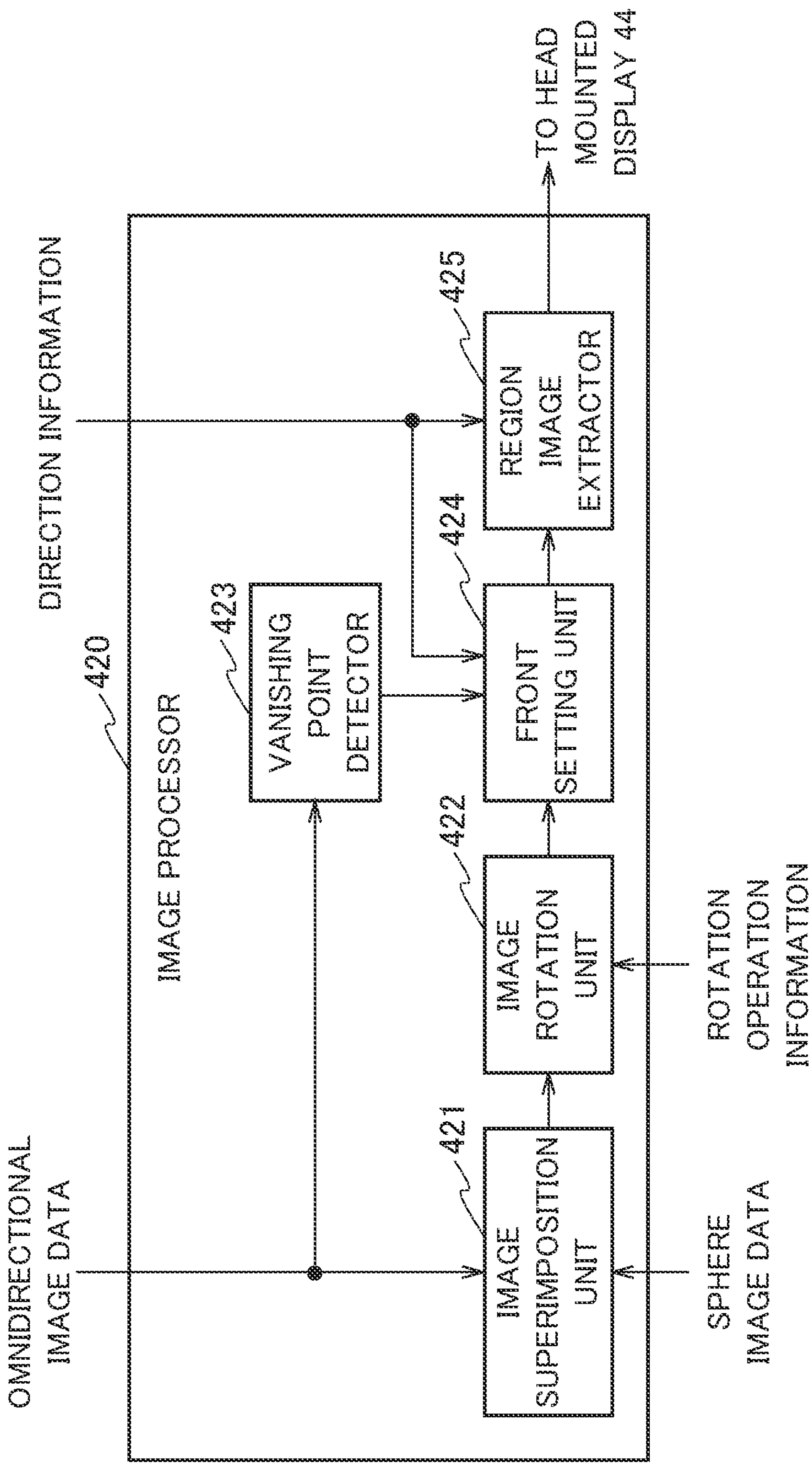
FIG. 4 is a block diagram illustrating a specific configuration example of an image processor included in the image adjustment device and virtual reality image display system according to a first embodiment.

The VR image display system 40 includes a communication unit 41, a controller 42, an image generator 43, a head-mounted display 44, glove-type controllers 45, a VR chair 46, and an operating unit 47. The controller 42 includes an image processor 420. At least the image generator 43 and image processor 420 constitute an image adjustment device. As illustrated in FIG. 4, the image processor 420 according to a first embodiment includes an image superimposition unit 421, an image rotation unit 422, a vanishing point detector 423, a front setting unit 424, and a region image extractor 425.

The controller 42 may be composed of a microcomputer or a microprocessor, or may be a central processing unit (CPU) included in a microcomputer. The image processor 420 configured as illustrated in FIG. 4 may be implemented by the CPU executing a computer program. At least a part of the image processor 420 may be composed of a hardware circuit. Choice of the hardware and the software is arbitrary.

Figure 5:
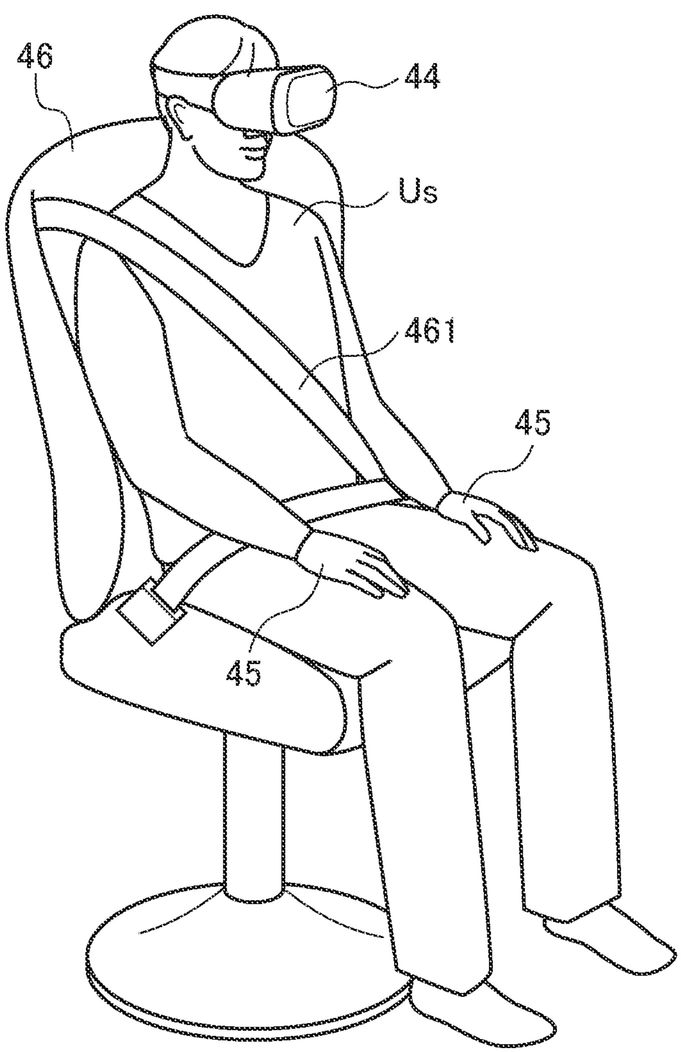
FIG. 5 is a perspective view illustrating a user who is sitting in a VR chair and is watching an omnidirectional image captured with the omnidirectional camera.

As illustrated in FIG. 5, a user Us watching the omnidirectional image based on the omnidirectional image data transmitted from the image transmission server 31 sits in the VR chair 46 wearing the head-mounted display 44 on his/her head and the glove-type controllers 45 on his/her hands.

When the VR chair 46 is in a reference position, the seat surface of the VR chair 46 is adjusted to be horizontal at a predetermined height. The height and angle of the VR chair 46 being in the reference position are referred to as a reference height and a reference angle of the VR chair 46, respectively. The VR chair 46 is equipped with a seatbelt 461, which is worn by the user Us. When the user Us wears the seatbelt 461, a signal indicating that the user Us wears the seatbelt 461 is supplied to the controller 42. The seatbelt 461 is an example of a safety device.

The communication unit 41 communicates with the image transmission server 31 via the network 20 to receive the omnidirectional image data and acceleration detection signal transmitted from the image transmission server 31. The communication unit 41 supplies the omnidirectional image data and acceleration detection signal to the controller 42. The image generator 43, upon being instructed by the operating unit 47 to output sphere image data, uses computer graphics to generate the sphere image data and supplies the sphere image data to the controller 42.

In FIG. 4, the image superimposition unit 421 receives the omnidirectional image data transmitted from the image transmission server 31 and the sphere image data generated by the image generator 43. The image superimposition unit 421 superimposes the sphere image data on the omnidirectional image data to generate superimposed image data.

The superimposed image data are supplied through the image rotation unit 422 and front setting unit 424 to the region image extractor 425. The region image extractor 425 is supplied from the head-mounted display 44 with direction information indicating the direction that the head-mounted display 44 (the user Us) faces. Based on the supplied direction information, the region image extractor 425 extracts region image data corresponding to the direction that the user Us faces, from the superimposed image data or omnidirectional image data and supplies the extracted region image data to the head-mounted display 44.

The image superimposition unit 421 determines a horizontal plane of the omnidirectional image data based on the auxiliary information attached to the omnidirectional image data to superimpose the sphere image data on the omnidirectional image data. When the auxiliary information is not attached to the omnidirectional image data, the image processor 420 determines a horizontal plane of the omnidirectional image data by detecting the horizontal plane from the omnidirectional image.

Figure 6:
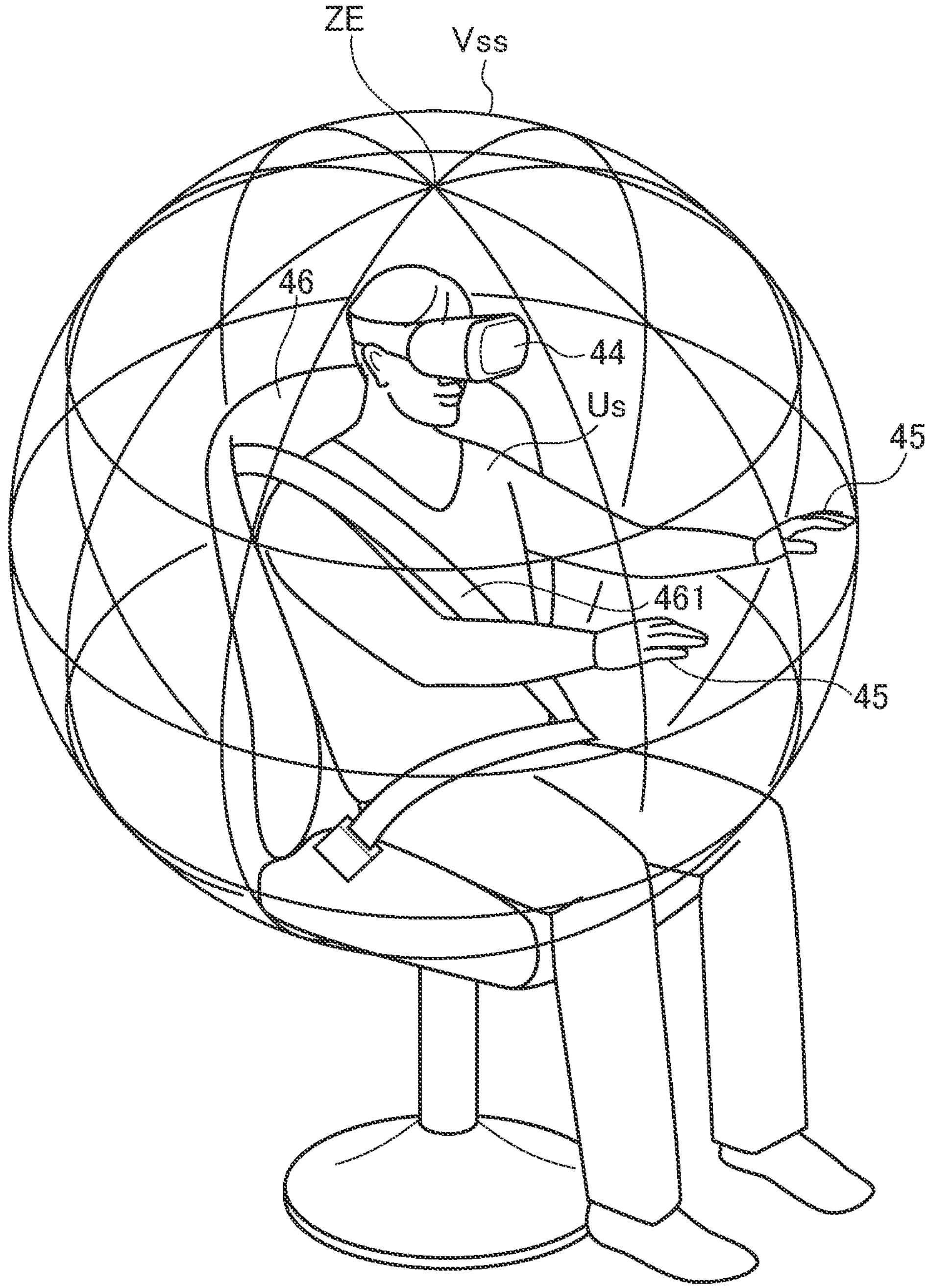
FIG. 6 is a conceptual diagram illustrating a sphere image with the user virtually situated inside, the sphere image being created by an image generator included in the image adjustment device and virtual reality image display system according to each embodiment to adjust the horizontal plane of the omnidirectional image.

FIG. 6 conceptually illustrates a sphere image VSS based on the sphere image data. The sphere image VSS is composed of line images indicating latitudes and line images indicating longitudes, for example. Almost the upper body of the user Us is virtually positioned within the sphere image VSS. The sphere image VSS is displayed so as to be positioned within arm's reach of the user Us. When the user Us watches an unillustrated omnidirectional image in FIG. 6, and the auxiliary information is incorrect or the horizontal plane detected by the image processor 420 is incorrect, the zenith of the omnidirectional image does not match the zenith ZE of the sphere image VSS. This gives an uncomfortable feeling to the user Us.

The image processor 420 is therefore configured to correct the tilt of the horizontal plane of the omnidirectional image so that the zenith of the omnidirectional image matches the zenith ZE of the sphere image VSS. In FIG. 6, the sphere image VSS is displayed so as to be positioned within arm's reach of the user Us. The user Us wearing the glove-type controllers 45 on his/her hands is able to stretch his/her hands out and thereby feel like as if they touched the sphere image VSS.

Each glove-type controller 45 preferably includes an actuator on the inner surface that comes into contact with a hand. The actuator is activated by the controller 42 when the glove-type controllers 45 reach positions where the glove-type controllers 45 can touch the sphere image VSS. This provides the user Us with a realistic sensation of touching the sphere image VSS.

When the user Us touches the sphere image VSS with the glove-type controllers 45 and rotates the sphere image VSS in a certain direction, rotation operating information outputted from the glove-type controllers 45 is inputted to the image rotation unit 422. The image rotation unit 422 then rotates the omnidirectional information in response to the rotation operating information. The user Us thus easily corrects the tilt of the horizontal plane of the omnidirectional image. The zenith of the omnidirectional image thereby matches the zenith ZE of the sphere image VSS, eliminating the uncomfortable feeling of the user Us. The image rotation unit 422 holds the correction value for the tilt of the horizontal plane.

After correcting the horizontal plane, the user Us preferably operates the operating unit 47 to hide the sphere image VSS. The user Us may remove the glove-type controllers 45 after correcting the horizontal plane.

The aforementioned correction of the horizontal plane of the omnidirectional image is executable while the vehicle 10 is stopped. Only correcting the horizontal plane cannot allow the user Us to recognize which direction in the omnidirectional image corresponds to the front of the subject that is being captured with the omnidirectional camera 12.

Figure 7:
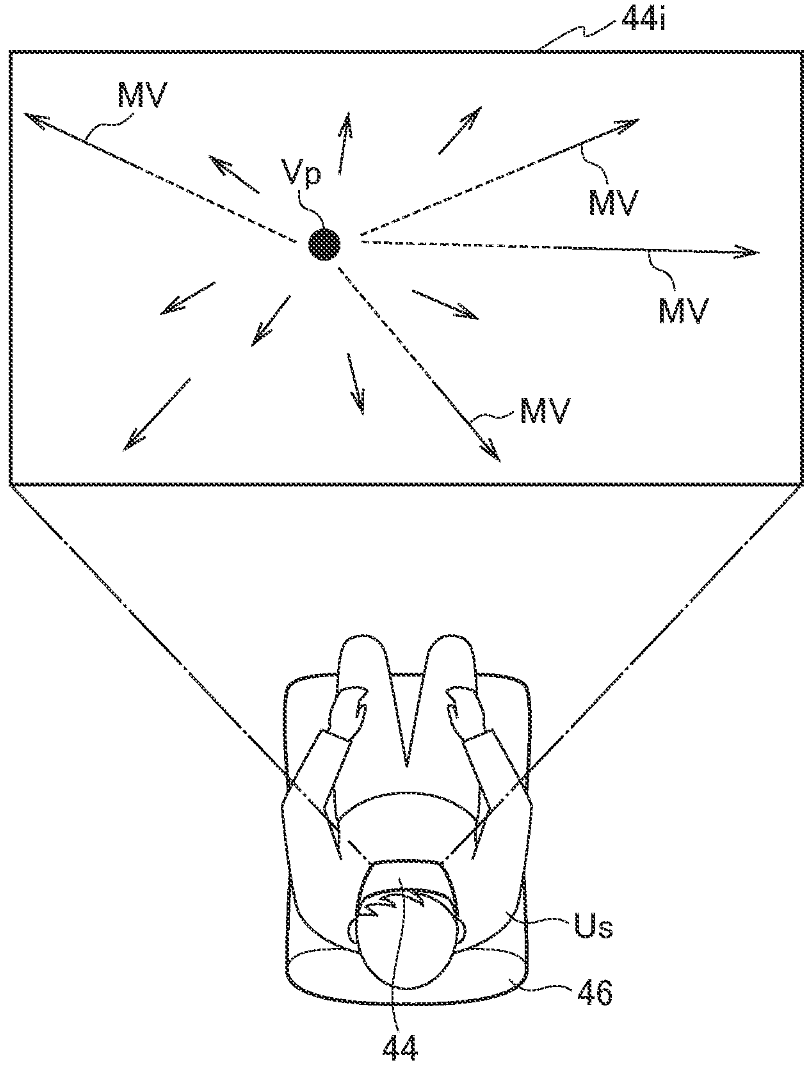
FIG. 7 is a view for explaining an operation of a front setting unit included in the image adjustment device and virtual reality image display system according to each embodiment to determine the front of the omnidirectional image based on a vanishing point of the omnidirectional image.

Herein, it is assumed that the user Us faces forward and region image data corresponding to the front of the omnidirectional image is being supplied to the head-mounted display 44. When the vehicle 10 starts to move, the user Us watches a region image 44*i* showing the scene radially expanding from a vanishing point Vp as illustrated in FIG. 7. If the front of the omnidirectional image is not determined, the vanishing point Vp is not always located within the region image 44*i*.

The vanishing point detector 423 detects inter-frame motion vectors MV based on at least two frame-images. The vanishing point detector 423 detects the vanishing point Vp as the intersection of extensions of the plural motion vectors MV in the negative directions thereof. To detect the vanishing point Vp, the vanishing point detector 423 may use either a left-eye image signal or a right-eye image signal.

The front setting unit 424, based on the vanishing point Vp detected by the vanishing point detector 423, determines the front of the omnidirectional image that corresponds to the front of the subject that is being captured by the omnidirectional camera 12. The front setting unit 424 rotates the omnidirectional image while maintaining the corrected horizontal plane so that the front of the omnidirectional image corresponds to the region image 44*i* extracted when the user Us is facing forward. Preferably, the front setting unit 424 rotates the omnidirectional image so that the vanishing point Vp is positioned in front of the face of the user Us facing forward.

Thus, the front of the omnidirectional image automatically corresponds to the region image 44*i* which appears on the head-mounted display 44 when the user Us is facing forward. In addition, the front of the omnidirectional image can be manually determined by rotating the sphere image VSS with the glove-type controllers 45.

The VR chair 46 is configured to rotate in a horizontal plane, to tilt sideways, forward, or rearward, and to change its height. The controller 42 is supplied with the angle of rotation of the VR chair 46 in the horizontal plane, right and left tilt angles thereof, forward and rearward tilt angles thereof, and vertical position information thereof.

The front setting unit 424 may rotate the omnidirectional image so that the vanishing point Vp is positioned in the direction of the rotation angle of the VR chair 46 in the horizontal plane. The direction of the rotation angle of the VR chair 46 is equivalent to the direction of the face of the user Us facing forward. When the omnidirectional image is rotated so that the vanishing point Vp is located in the direction at the rotation angle of the VR chair 46, therefore, the front of the omnidirectional image also corresponds to the region image 44*i* displayed when the user Us is facing forward.

Figure 8:
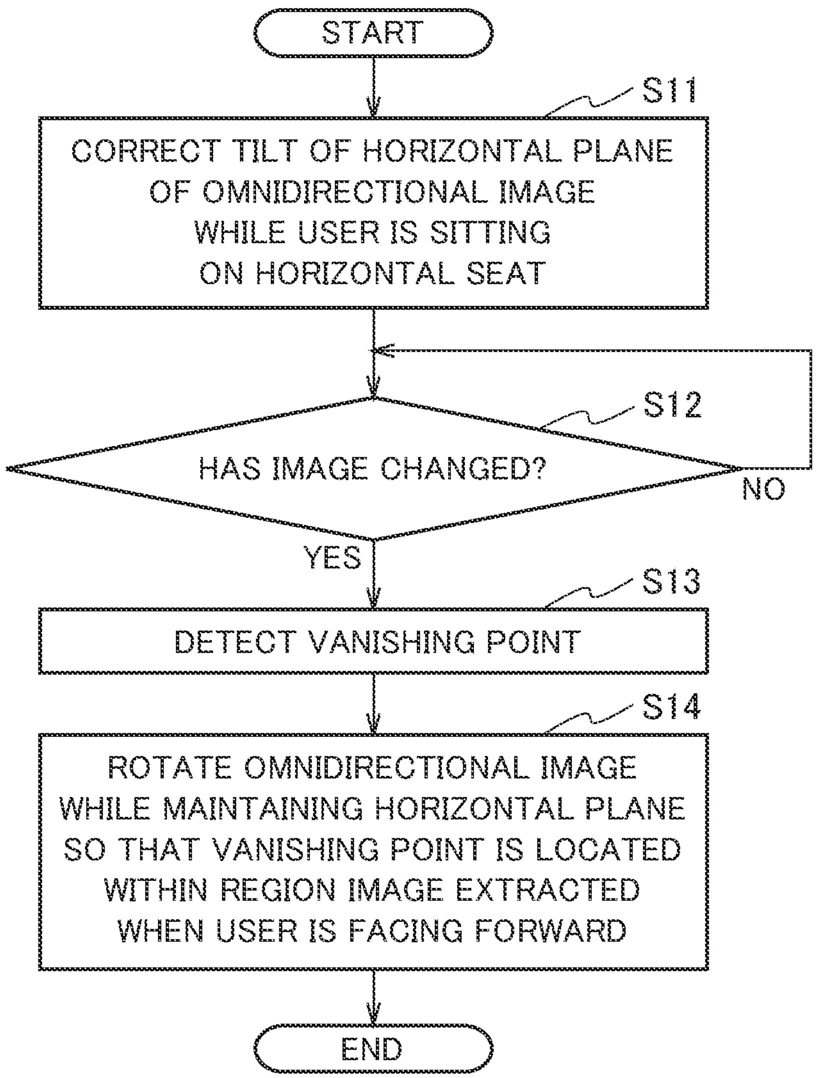
FIG. 8 is a flowchart illustrating a process executed by the image adjustment device according to a first embodiment.

Using the flowchart illustrated in FIG. 8, the process executed in a first embodiment is described. In FIG. 8, when the process starts, the image rotation unit 422 corrects the tilt of the horizontal plane of the omnidirectional image by rotating the sphere image VSS through the glove-type controllers 45 while the user Us is sitting on the horizontal seat surface of the VR chair 46 in step S11. In step S12, the image processor 420 (the vanishing point detector 423) determines whether the omnidirectional image has changed. If the omnidirectional image has not changed (NO), the image processor 420 repeats the processing of step S12.

If the omnidirectional image has changed in step S12 (YES), it means that the vehicle 10 is moving, and the vanishing point detector 423 detects the vanishing point Vp in step S13. In step S14, the front setting unit 424 rotates the omnidirectional image while maintaining the horizontal plane so that the vanishing point Vp is located within the region image 44*i* extracted when the user Us is facing forward. The process is then terminated.

According to a first embodiment described above, the tilt of the horizontal plane of the omnidirectional image which is captured with the omnidirectional camera 12 and is displayed on the head-mounted display 44 is easily corrected. According to a first embodiment, the front of the omnidirectional image automatically corresponds to the region image 44*i* displayed on the head-mounted display 44 when the user Us is facing forward.

Second Embodiment

In a second embodiment, the image adjustment device and VR image display system 40 correct the tilt of the horizontal plane of the omnidirectional image and determine the front of the omnidirectional image in the same manner as a first embodiment. In addition, the image adjustment device and VR image display system 40 provide the user Us with a sense of presence according to the motion of the vehicle 10.

Figure 9:
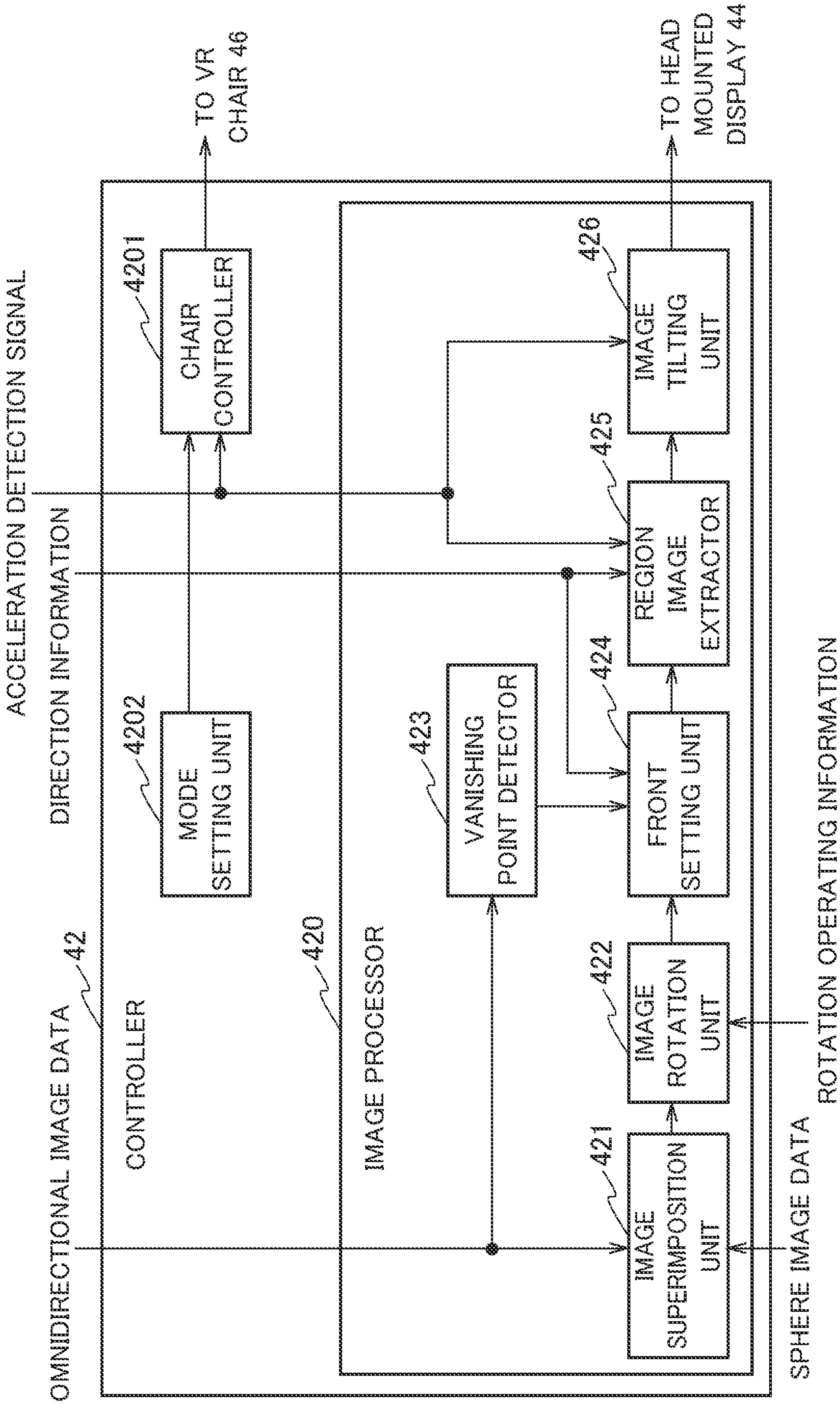
FIG. 9 is a block diagram illustrating a specific configuration example of a controller included in the image adjustment device and virtual reality image display system according to second and third embodiments.

As illustrated in FIG. 9, the controller 42 includes a chair controller 4201 and a mode setting unit 4202 in a second embodiment. The image processor 420 of the controller 42 includes an image tilting unit 426 which is supplied with region image data outputted from the region image extractor 425. The region image extractor 425, the image tilting unit 426, and the chair controller 4201 are supplied with the acceleration detection signal. In a second embodiment, it is not necessary to input the acceleration detection signal to the region image extractor 425.

Figure 10A:
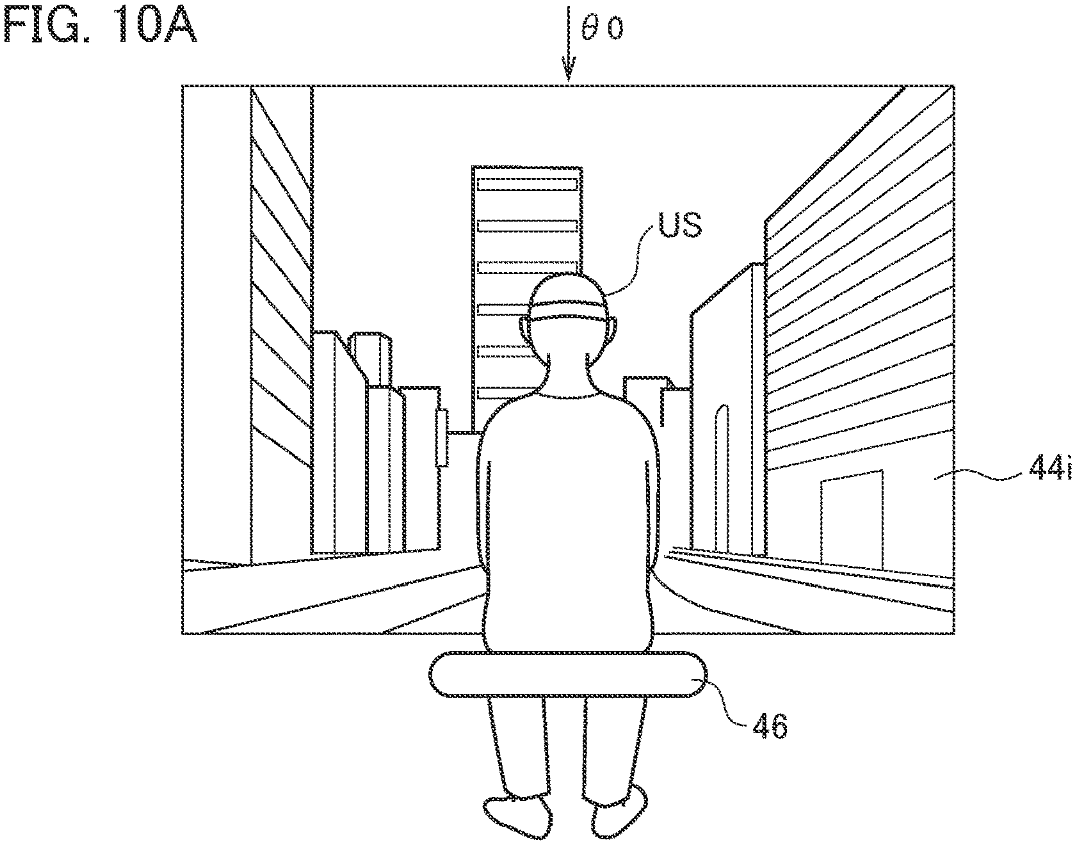
FIG. 10A is a view conceptually illustrating the situation where a region image as a part of an omnidirectional image captured when the vehicle is traveling straight is displayed on the head-mounted display.

FIG. 10A conceptually illustrates the user Us watching the region image 44*i* when the vehicle 10 is traveling straight and the accelerometer 13 detects an angle θ0 as the direction of the gravitational acceleration. In FIG. 10A, the back of the VR chair 46 is omitted, and only the seat adjusted to be horizontal is illustrated.

Figure 10B:
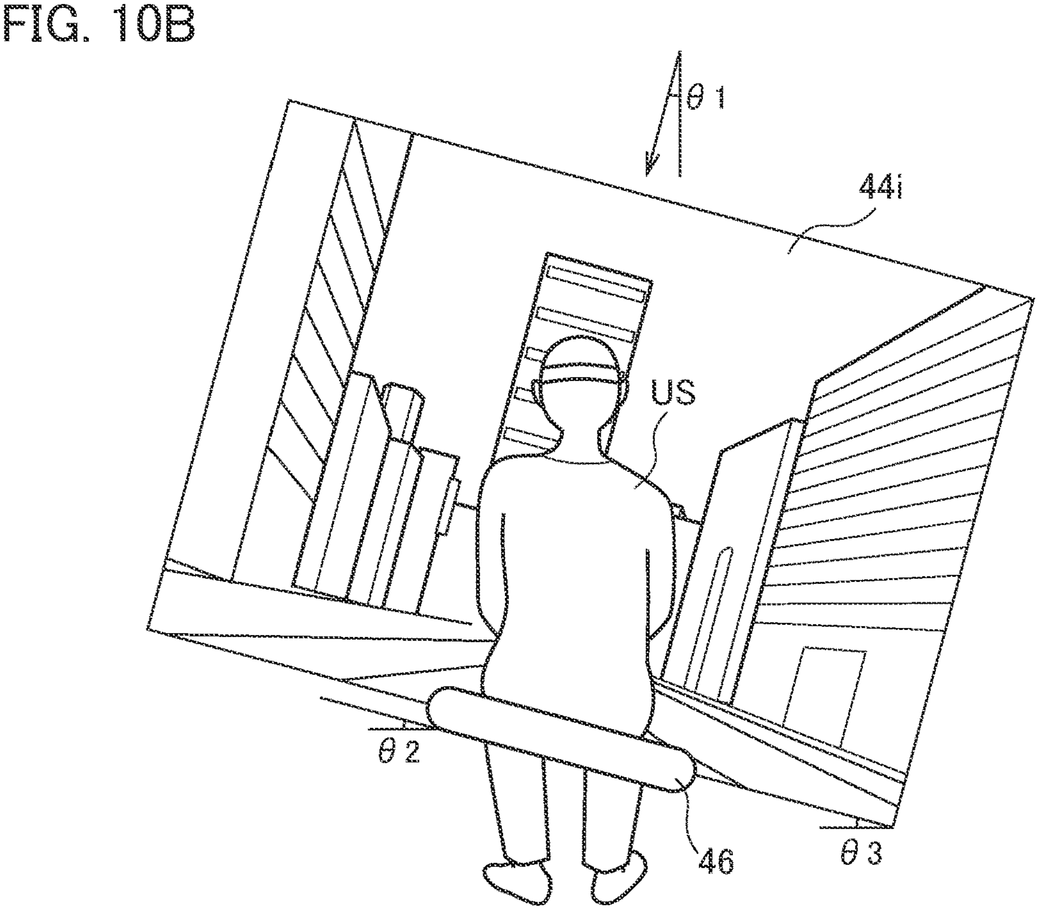
FIG. 10B is a view conceptually illustrating the situation where a region image as a part of an omnidirectional image captured when the vehicle is turning left is displayed on the head-mounted display and the region image and a VR chair are tilted to the right.

As illustrated in FIG. 10B, when the vehicle 10 turns left, the accelerometer 13 detects a certain angle θ1 to the left side. The chair controller 4201 therefore controls the VR chair 46 to tilt the VR chair 46 to the right by a certain angle θ2. The image tilting unit 426 tilts the region image 44*i* outputted from the region image extractor 425, to the right by a certain angle θ3.

When the vehicle 10 turns right, the accelerometer 13 detects a certain angle θ1 to the right side. The chair controller 4201 therefore controls the VR chair 46 to tilt the VR chair 46 to the left by a certain angle θ2. The image tilting unit 426 tilts the region image 44*i* to the left by a certain θ3.

The angle θ2 may be the same or different from the angle θ1. The angle θ3 may be the same or different from the angle θ1. The angle θ2 may be the same or different from the angle θ3.

To only provide the user Us with a sense of presence as if the user Us is in the vehicle 10, the angles θ2 and θ3 are set equal to or smaller than the angle θ1. Such a mode of the VR image display system 40 to provide the user Us a sense of presence as if the user Us is on the vehicle 10 is referred to as a normal mode. To provide the user Us with a sense of presence with the motion of the vehicle 10 being emphasized, the angles θ2 and θ3 are preferably set greater than the angle θ1. Such a mode to provide the user Us a sense of presence with the motion of the vehicle 10 being emphasized is referred to as an emphasizing mode.

One of the normal mode or emphasizing mode is selected by the user Us through the operating unit 47 and is set in the mode setting unit 4202 in advance.

Figure 11:
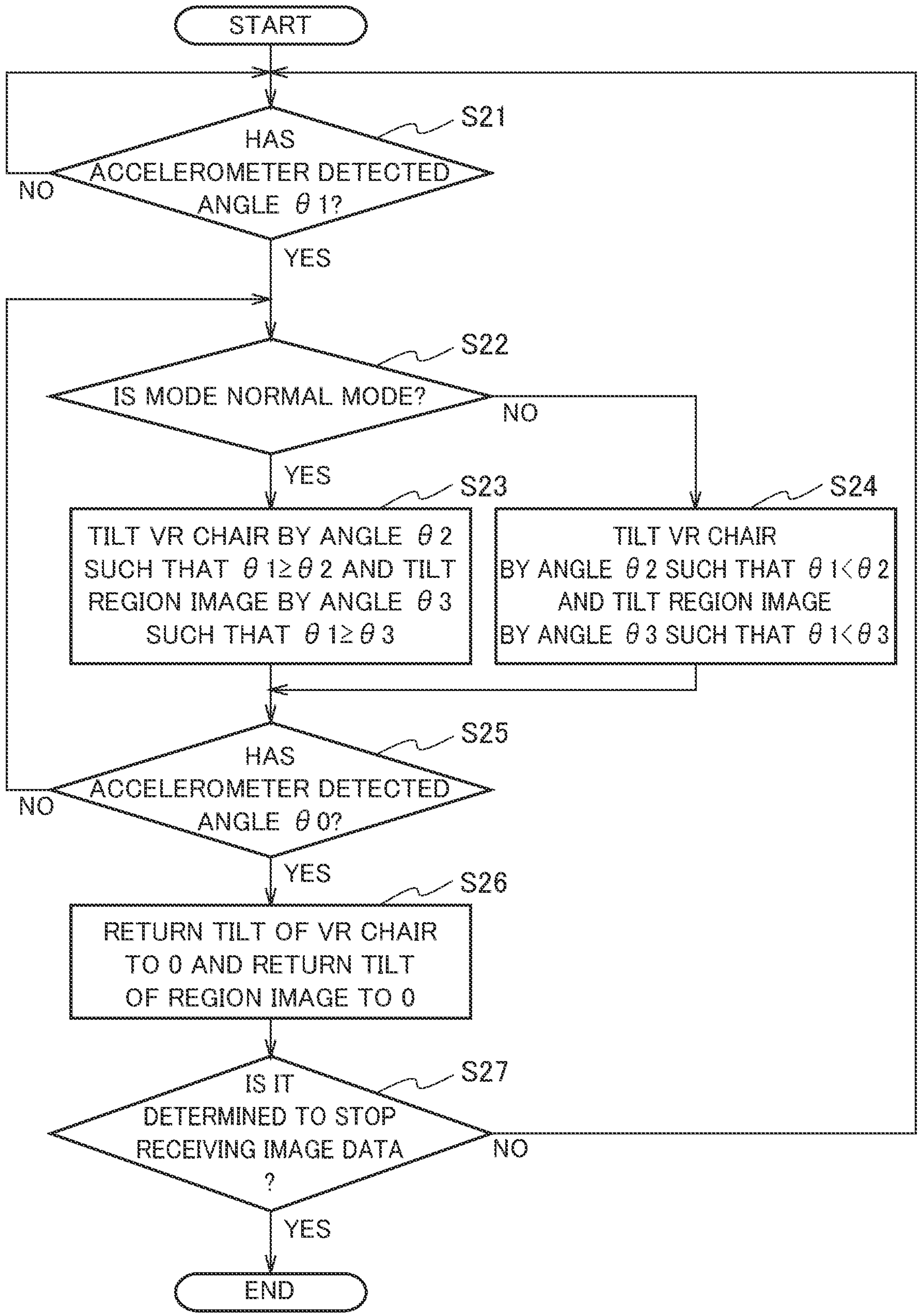
FIG. 11 is a flowchart illustrating a process executed by the image adjustment device and virtual reality image display system according to a second embodiment.

The process executed in a second embodiment is described using the flowchart illustrated in FIG. 11. In FIG. 11, when the process starts, the controller 42 determines whether the accelerometer 13 has detected an angle θ1 in step S21. When the accelerometer 13 has not detected an angle θ1 (NO), the controller 42 repeats the processing of step S21. When the accelerometer 13 has detected an angle θ1 (YES), in step S22, the controller 42 (the mode setting unit 4202) determines whether the VR image display system 40 is in the normal mode.

When the VR image display system 40 is in the normal mode in step S22 (YES), in step S23, the chair controller 4201 tilts the VR chair 46 to the right or left by an angle θ2 equal to or smaller than the angle θ1 (θ1≥θ2), and the image tilting unit 426 tilts the region image 44*i* to the right or left by the angle θ3 equal to or smaller than θ1 (θ1≥θ3).

When the VR image display system 40 is not in the normal mode in step S22 (NO), it means that the VR image display system 40 is in the emphasizing mode. In step S24, the chair controller 4201 tilts the VR chair 46 to the right or left by an angle θ2 greater than θ1 (θ1<θ2), and the image tilting unit 426 tilts the region image 44*i* to the right or left by an angle θ3 greater than θ1 (θ1<θ3).

In step S25 subsequent to step S23 or S24, the controller 42 determines whether the accelerometer 13 has detected the angle θ0. When the accelerometer 13 has not detected the angle θ0 (NO), the controller 42 or image processor 420 repeats the processing of steps S22 to S25. When the accelerometer 13 has detected the angle θ0 (YES), in step S26, the chair controller 4201 returns the tilt of the VR chair 46 to zero, and the image tilting unit 426 returns the tilt of the region image 44*i* to zero.

In step S27, the controller 42 determines whether to stop receiving the image data from the image transmission server 31. When the controller 42 determines not to stop receiving the image data (NO), the controller 42 or image processor 420 repeats the processing of steps S21 to S27. When the controller 42 determines to stop receiving the image data (YES), the controller 42 terminates the process.

According to a second embodiment described above, in addition to the effects of a first embodiment, the VR image display system 40 provides the user Us with a sense of presence equivalent to the sensation that occupants of the vehicle 10 experience when the vehicle 10 turns right or left. The VR image display system 40 can be selected by the user Us from two modes including the normal and emphasizing modes. This allows setting according to the preference of the user Us, whether the user Us wants to experience a sense of presence as if the user Us is in the vehicle 10 or a stronger sense of presence with the motion of the vehicle 10 being emphasized.

In a second embodiment, the VR image display system 40 may be configured to tilt only the VR chair 46 while not tilting the region image 44*i*. It is certainly preferred that the region image 44*i* be tilted according to the VR chair 46 being tilted.

Third Embodiment

In a third embodiment, the image adjustment device and VR image display system 40 correct the tilt of the horizontal plane of the omnidirectional image and determine the front of the omnidirectional image in the same manner as a first embodiment. In addition, the image adjustment device and VR image display system 40 provide the user Us with a sense of presence according to the motion of the vehicle 10 in a different manner from a second embodiment. The controller 42 according to a third embodiment may have the same configuration as that illustrated in FIG. 9, but does not need to include the image processor 4202 and image tilting unit 426.

Figure 12A:
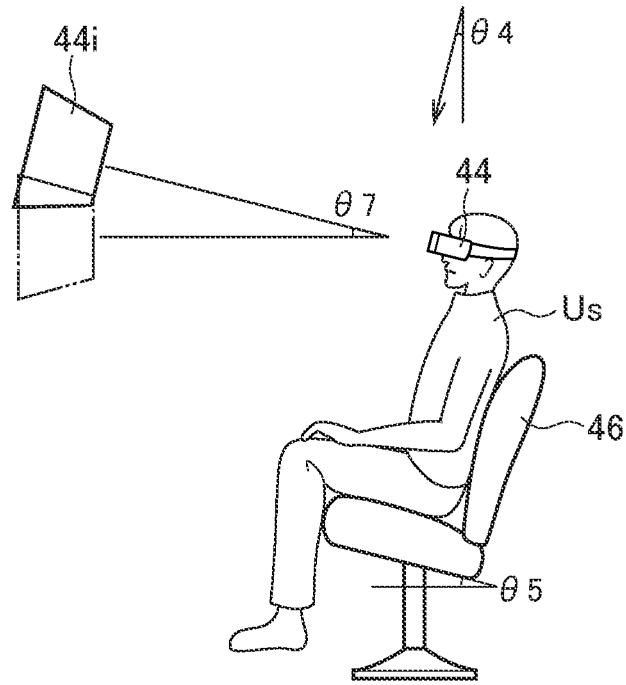
FIG. 12A is a view conceptually illustrating the situation where the VR chair is tilted rearward and the region image is rotated accordingly while the vehicle moving forward is accelerating.

As illustrated in FIG. 12A, when the vehicle 10 that is traveling forward accelerates and the accelerometer 13 detects an angle θ4 to the front, the chair controller 4201 controls the VR chair 46 to tilt the VR chair 46 rearward by a certain angle θ5. The region image extractor 425 extracts the region image 44*i* accordingly rotated upward by a certain angle θ7 from the previous region image 44*i* (indicated by a two-dash chain line) which was extracted before the tilt of the VR chair 46 by the angle θ5. The region image extractor 425 supplies the newly extracted region image 44*i* to the head-mounted display 44.

Figure 12B:
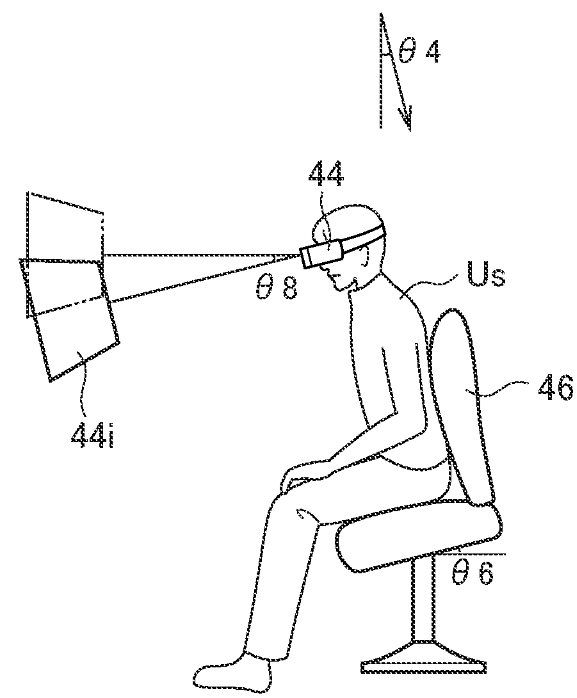
FIG. 12B is a view conceptually illustrating the situation where the VR chair is tilted forward and the region image is rotated accordingly while the vehicle moving forward is decelerating.

As illustrated in FIG. 12B, when the vehicle 10 that is traveling forward decelerates and the accelerometer 13 detects an angle θ4 to the rear side, the chair controller 4201 controls the VR chair 46 to tilt the VR chair 46 forward by a certain angle θ6. The region image extractor 425 accordingly extracts the region image 44*i* accordingly rotated downward a certain angle θ8 from the previous region image 44*i* (indicated by a two-dash chain line) which was extracted before the tilt of the VR chair 46 by the angle θ6. The region image extractor 425 supplies the newly extracted region image 44*i* to the head-mounted display 44.

The angle θ5 may be the same or different from the angle θ4. The angle θ7 may be the same or different from the angle θ5. The angle θ6 may be the same or different from the angle θ4. The angle θ8 may be the same or different from the angle θ6.

The angle θ6 is preferably smaller than the angle θ5, even when the angles θ4 to the front and rear sides are the same. The user Us is more likely to feel scared when sitting in the VR chair 46 tilting forward than when sitting in the VR chair 46 tilting rearward. The angle θ6 is preferably set to the angle θ5 multiplied by a value of less than 1. The angle θ6 is set to the angle θ5 multiplied by 0.8, for example.

Figure 13:
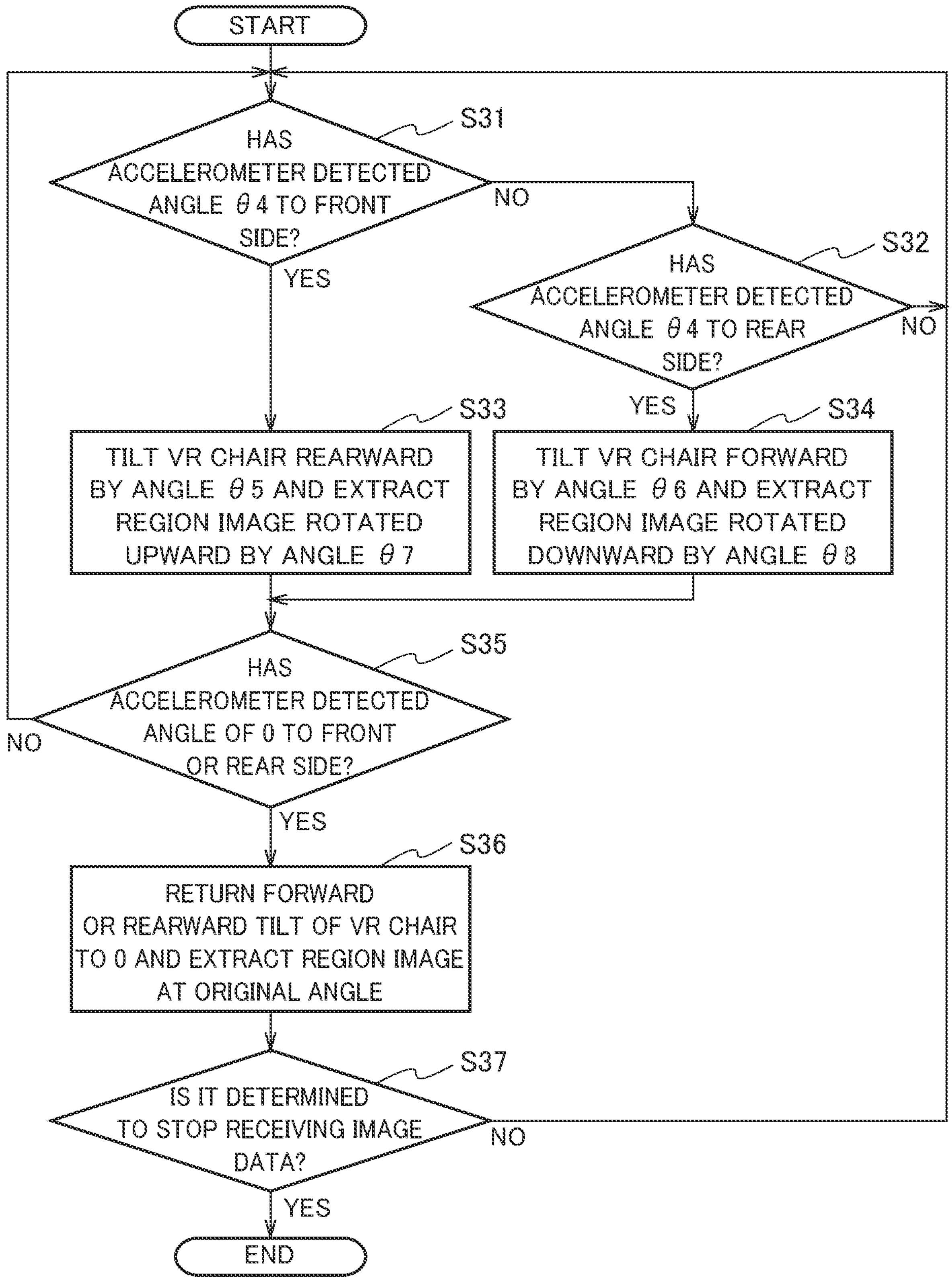
FIG. 13 is a flowchart illustrating a process executed by the image adjustment device and virtual reality image display system according to a third embodiment.

The process executed in a third embodiment is described using the flowchart illustrated in FIG. 13. In FIG. 13, when the process starts, the controller 42 determines whether the accelerometer 13 has detected an angle θ4 to the front side in step S31. When the accelerometer 13 has not detected an angle θ4 to the front side (NO), the controller 42 determines whether the accelerometer 13 has detected an angle θ4 to the rear side in step S32. The angles θ4 to the front and rear sides are unnecessarily the same and are individually set to proper angles.

When the accelerometer 13 has not detected an angle θ4 to the rear side (NO), the controller 42 repeats the processing of steps S31 and S32.

When the accelerometer 13 has detected an angle θ4 to the front side (YES) in step S31, the chair controller 4201 tilts the VR chair 46 rearward by an angle θ5, and the region image extractor 425 extracts the region image 44*i* rotated upward by an angle θ7 from the previous region image 44*i*. When the accelerometer 13 has detected an angle θ4 to the rear side in step S32 (YES), the chair controller 4201 tilts the VR chair 46 forward by an angle θ6, and the region image extractor 425 extracts the region image 44*i* rotated downward by an angle θ8 from the previous region image 44*i*.

In step S35 subsequent to steps S33 or S34, the controller 42 determines whether the accelerometer 13 has detected an angle of 0 to the front or rear side. When the accelerometer 13 has not detected an angle of 0 (NO), the controller 42 or image processor 420 repeats the processing of steps S31 to S35. When the accelerometer 13 has detected an angle of 0 (YES), in step S36, the chair controller 4201 returns the forward or rearward tilt of the VR chair 46 to 0, and the region image extractor 425 extracts the region image 44*i* at the original angle.

In step S37, the controller 42 determines whether to stop receiving the image data from the image transmission server 31. When the controller 42 determines not to stop receiving the image data (NO), the controller 42 or image processor 420 repeats the processing of steps S31 to S37. When the controller 42 determines to stop receiving the image data (YES), the controller 42 terminates the process.

According to a third embodiment described above, the VR image display system 40 provides the user Us with a sense of presence equivalent to the sensation that occupants of the vehicle 10 experience when the vehicle 10 accelerates or decelerates, in addition to the effects of a first embodiment. The VR image display system 40 according to a third embodiment may be configured to tilt only the VR chair 46 while not newly extracting the region image 44*i* rotated upward or downward. It is certainly preferred that the region image 44*i* rotated upward or downward is newly extracted according to the VR chair 46 being tilted.

Fourth Embodiment

Figure 14:
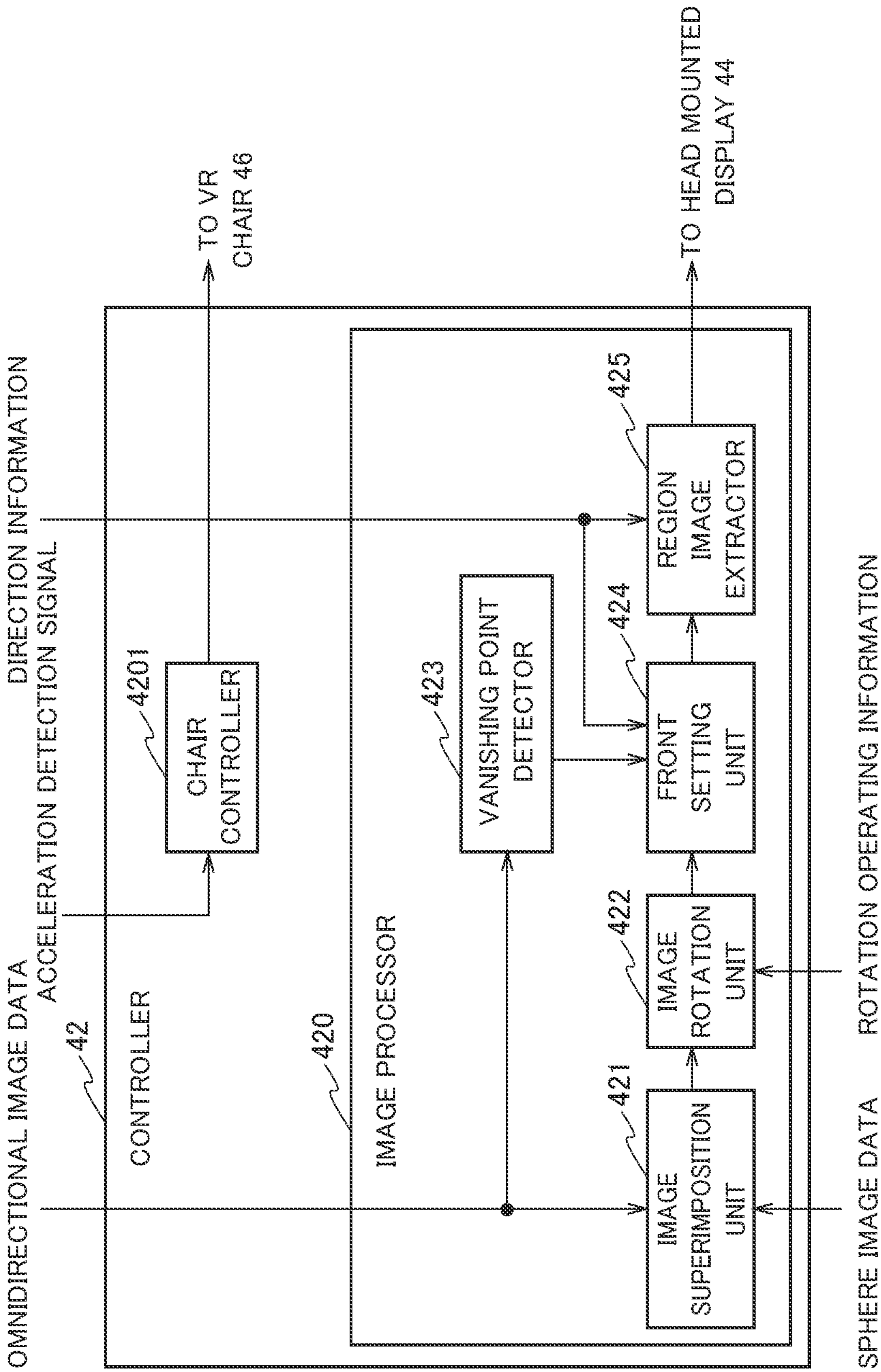
FIG. 14 is a block diagram illustrating a specific configuration example of a controller included in the image adjustment device and virtual reality image display system according to fourth and fifth embodiments.

In a fourth embodiment, the image adjustment device and VR image display system 40 correct the tilt of the horizontal plane of the omnidirectional image and determine the front of the omnidirectional image in the same manner as a first embodiment. In addition, the image adjustment device and VR image display system 40 provide the user Us with a sense of presence according to the motion of the vehicle 10 in a different manner from second and third embodiments. As illustrated in FIG. 14, the controller 42 includes the chair controller 4201. The image processor 420 included in the controller 42 has the same configuration as that illustrated in FIG. 3.

Figure 15:
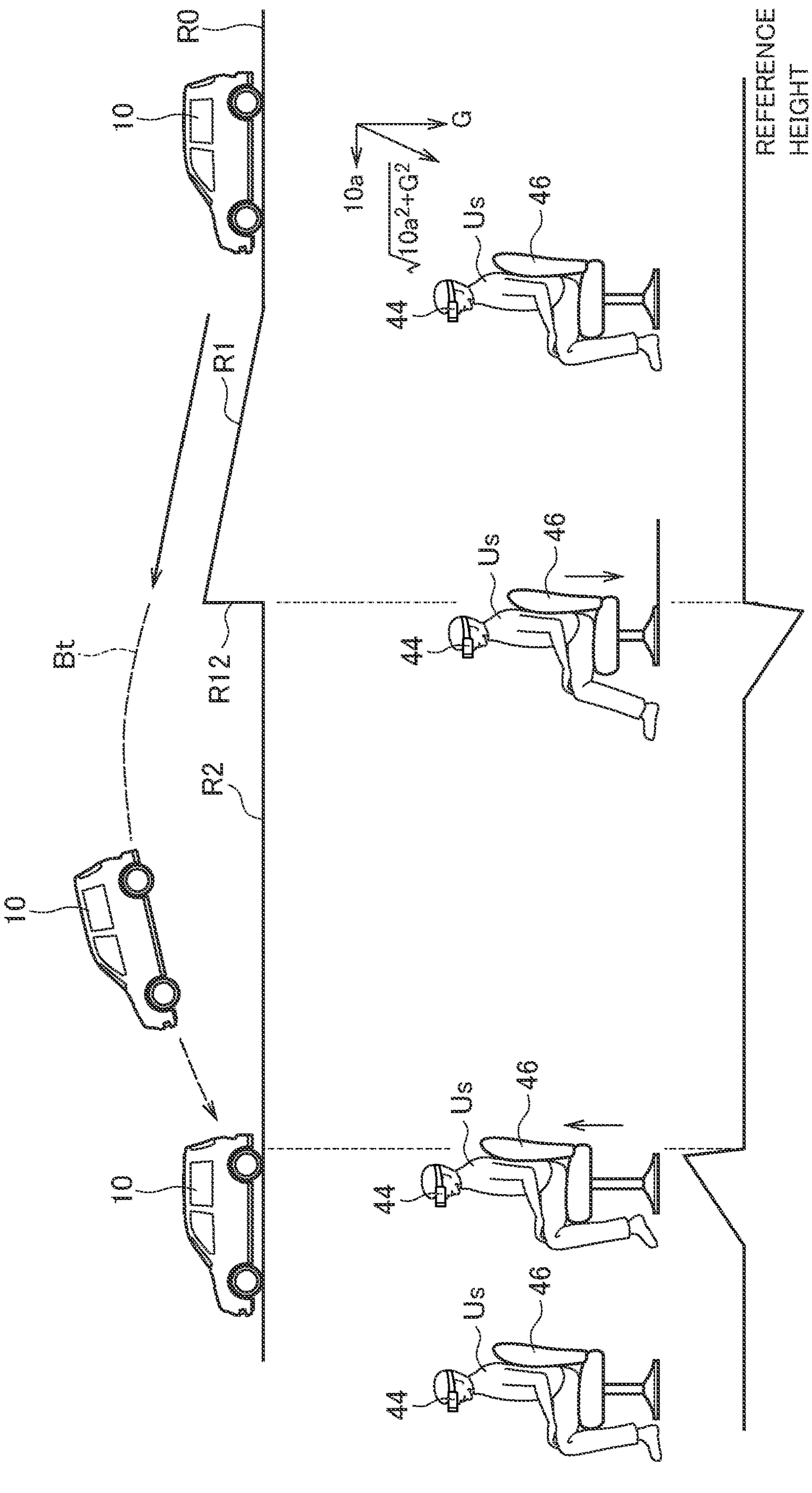
FIG. 15 is a diagram illustrating how to control the VR chair when the vehicle is following a ballistic trajectory in a fourth embodiment.

As illustrated in FIG. 15, a fourth embodiment assumes that the vehicle 10 travels on a road R0 and an uphill road R1 to be launched at a height difference R12 between the uphill road R1 and a road R2. The vehicle 10 launched at the height difference R12 proceeds along a ballistic trajectory Bt, lands on the road R2, and continues to travel. If the vehicle 10 traveling on the road R0 accelerates at an acceleration 10*a*, the acceleration detected by the accelerometer 13 is the square root of the sum of squares of the acceleration 10*a* and squares of the gravitational acceleration G, which is therefore equal to or greater than the gravitational acceleration G.

While the vehicle 10 launched at the height difference R12 is proceeding along the ballistic trajectory Bt, the acceleration detected by the accelerometer 13 is equal to zero or an extremely small value. It is therefore determined that the time the acceleration detected by the accelerometer 13 rapidly drops from a predetermined value equal to or greater than the gravitational acceleration G corresponds to the time the vehicle 10 starts proceeding along the ballistic trajectory Bt. When the vehicle 10 lands on the road R2, the accelerometer 13 detects an acceleration equal to or greater than the gravitational acceleration G. It is therefore determined that the time the acceleration detected by the accelerometer 13 rapidly increases from zero or an extremely small value corresponds to the time the vehicle 10 completes proceeding along the ballistic trajectory Bt.

When the vehicle 10 is traveling on the road R0 and uphill road R1, the VR chair 46 is positioned at the reference height. When the supplied acceleration detection signal rapidly drops from a predetermined value, the chair controller 4201 controls the VR chair 46 to lower the VR chair 46 by a predetermined height in a short time and gradually return the VR chair 46 to the reference height. When the supplied acceleration detection signal rapidly increases from zero or an extremely small value, the chair controller 4201 controls the VR chair 46 to raise the VR chair 46 by a predetermined height within a short time period and gradually return the VR chair 46 to the reference height.

Figure 16:
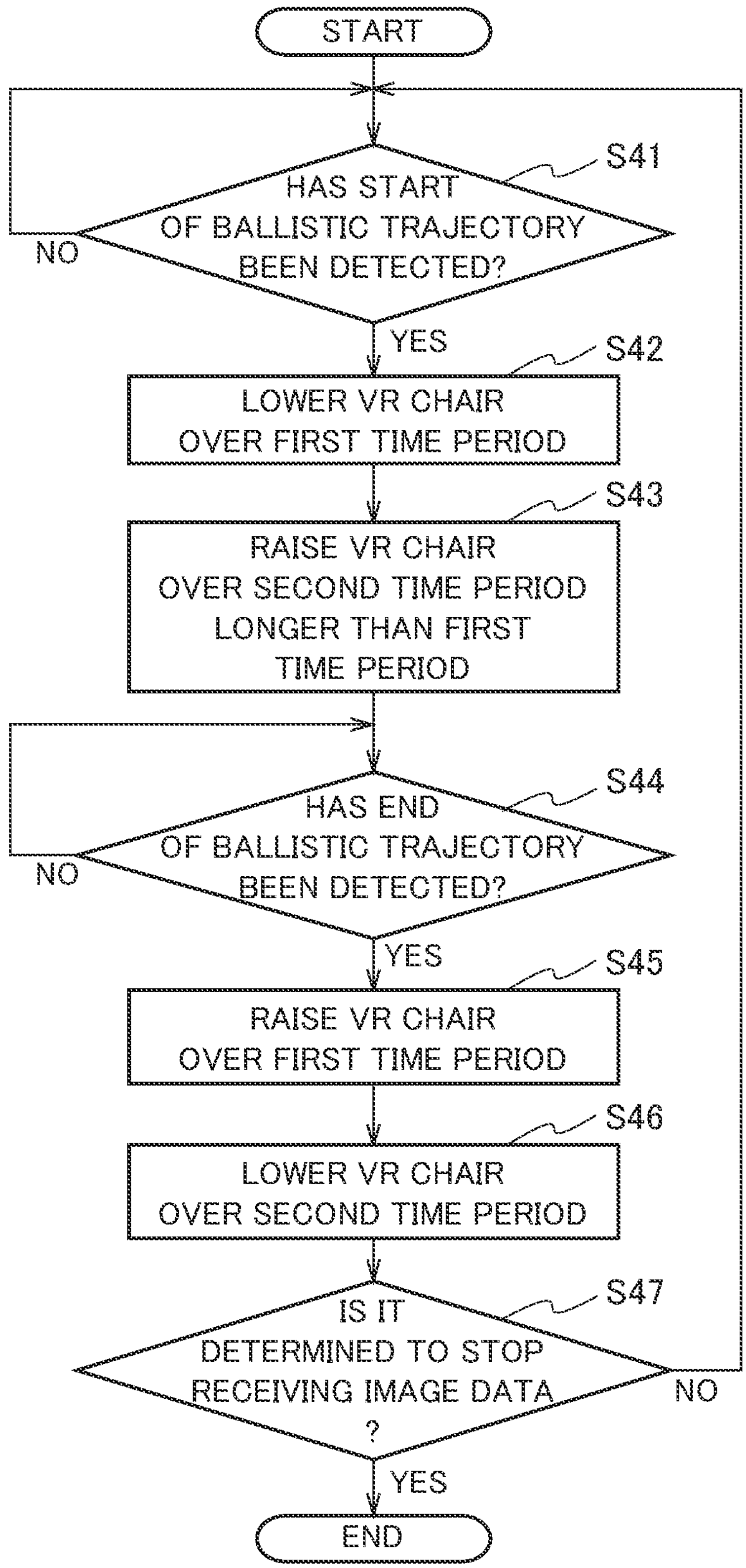
FIG. 16 is a flowchart illustrating a process executed by the virtual reality image display system according to a fourth embodiment.

The process executed in a fourth embodiment is described using the flowchart illustrated in FIG. 16. In FIG. 16, when the process starts, the controller 42 determines whether the controller 42 has detected the start of the ballistic trajectory Bt in step S41. When the controller 42 has not detected the start of the ballistic trajectory Bt (NO), the controller 42 repeats the processing of step S41. When the accelerometer 13 has detected the start of the ballistic trajectory Bt (YES), the chair controller 4201 lowers the VR chair 46 over a first time period in step S42 and raises the VR chair 46 over a second time period in step S43. Herein, the second time period is longer than the first time period.

Subsequently, the controller 42 determines that the controller 42 has detected the end of the ballistic trajectory Bt in step S44. When the controller 42 has not detected the end of the ballistic trajectory Bt (NO), the controller 42 repeats the processing of step S44. When the controller 42 has detected the end of the ballistic trajectory Bt (YES), the chair controller 4201 raises the VR chair 46 over the first time period in step S45 and lowers the VR chair 46 over the second time period in step S46.

The first time in step S45 is unnecessarily equal to the first time in step S42. The second time in step S46 is unnecessarily equal to the second time in step S43.

In step S47, the controller 42 determines whether to stop receiving the image data from the image transmission server 31. When the controller 42 determines not to stop receiving the image data (NO), the controller 42 (the chair controller 4201) repeats the processing of steps S41 to S47. When the controller 42 determines to stop receiving the image data (YES), the controller 42 terminates the process.

According to a fourth embodiment described above, the VR image display system 40 provides the user Us with a sense of presence equivalent to the sensation that occupants of the vehicle 10 experience when the vehicle 10 proceeds along the ballistic trajectory Bt, in addition to the effects of a first embodiment.

Fifth Embodiment

In a fifth embodiment, the image adjustment device and VR image display system 40 correct the tilt of the horizontal plane of the omnidirectional image and determine the front of the omnidirectional image in the same manner as a first embodiment. In addition, the image adjustment device and VR image display system 40 provide the user Us with a sense of presence according to the motion of the vehicle 10 proceeding along the ballistic trajectory Bt in a different manner from a fourth embodiment. The controller 42 in a fifth embodiment has the same configuration as that illustrated in FIG. 14.

Figure 17:
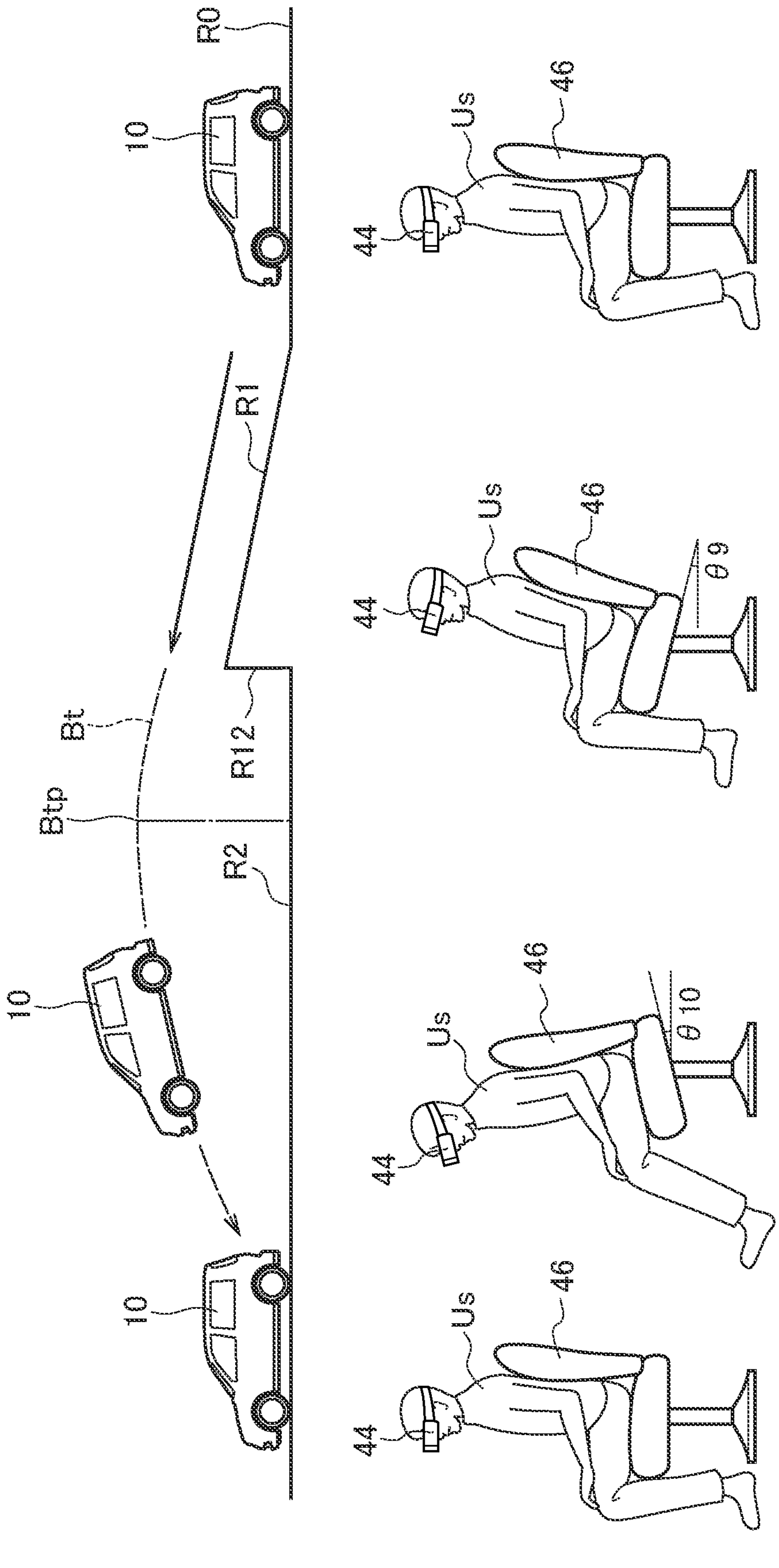
FIG. 17 is a view illustrating how to control the VR chair when the vehicle is following a ballistic trajectory in a fifth embodiment.

In FIG. 17, when the vehicle 10 is traveling on the roads R0 and uphill road R1, the VR chair 46 is positioned at the reference angle. When the supplied acceleration detection signal rapidly drops from a predetermined value, the chair controller 4201 controls the VR chair 46 to tilt the VR chair 46 rearward to an angle θ9.

The acceleration detected by the accelerometer 13 is minimized at a peak Btp of the ballistic trajectory Bt. When the acceleration detected by the accelerometer 13 is minimized, the chair controller 4201 controls the VR chair 46 to tilt the VR chair 46 forward to an angle θ10. The peak Btp cannot be detected until the vehicle 10 passes the peak Btp of the ballistic trajectory Bt. The VR chair 46 tilted rearward therefore starts to rotate forward after the vehicle 10 passes the peak Btp.

When the vehicle 10 lands on the road R2 and the acceleration detection signal rapidly increases, the chair controller 4201 controls the VR chair 46 to return the forward tilt of the VR chair 46 to the reference angle.

Figure 18:
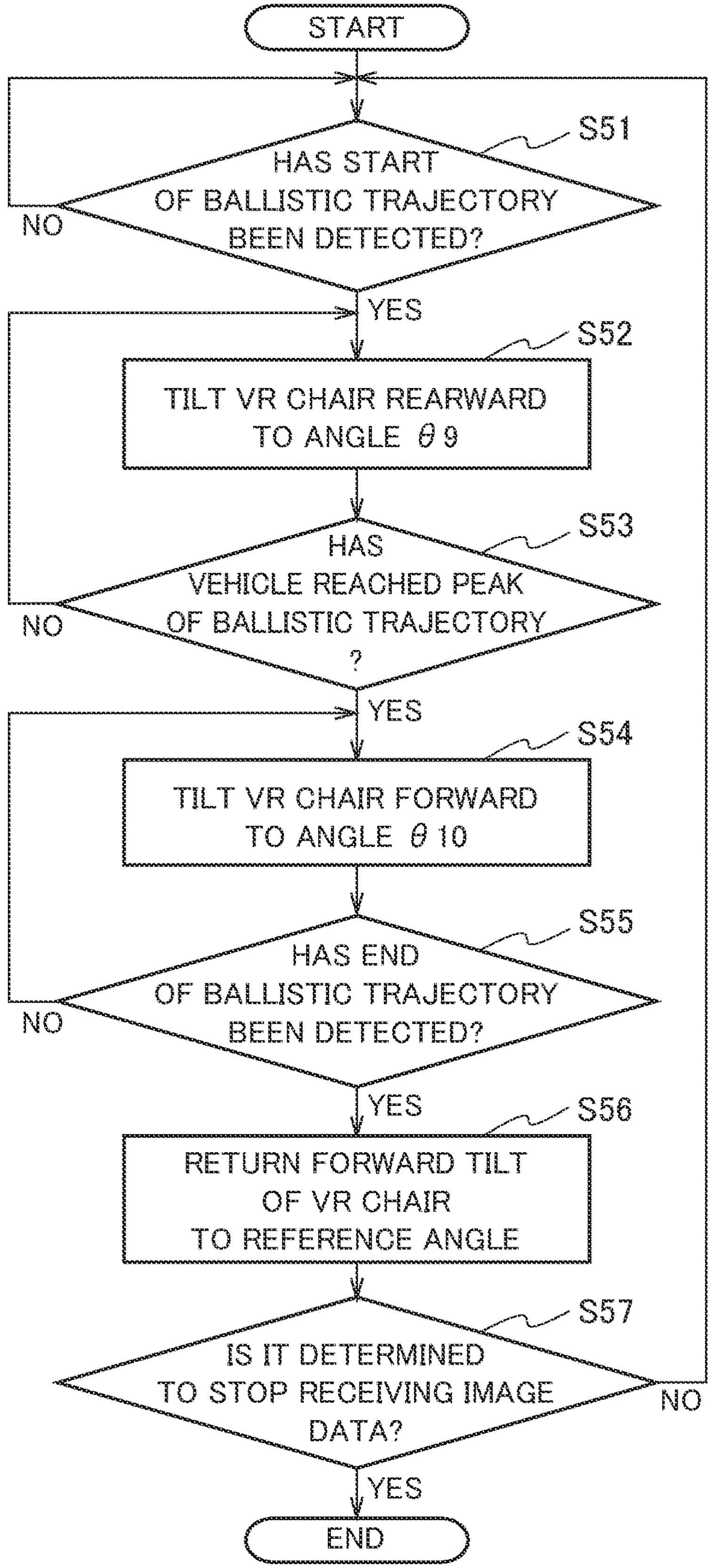
FIG. 18 is a flowchart illustrating a process executed by the virtual reality image display system according to a fifth embodiment.

The process executed in a fifth embodiment is described using the flowchart illustrated in FIG. 18. In FIG. 18, when the process starts, the controller 42 determines whether the controller 42 has detected the start of the ballistic trajectory Bt in step S51. When the controller 42 has not detected the start of the ballistic trajectory Bt (NO), the controller 42 repeats the processing of step S51. When the controller 42 has detected the start of the ballistic trajectory Bt (YES), the chair controller 4201 tilts the VR chair 46 rearward to the angle θ9 in step S52.

In step S53, the controller 42 determines whether the vehicle 10 has reached the peak Btp of the ballistic trajectory Bt. When the vehicle 10 has not reached the peak Btp (NO), the chair controller 4201 repeats the processing of step S52. When the vehicle 10 has reached the peak Btp (YES), the chair controller 4201 tilts the VR chair 46 forward to the angle θ10 in step S54.

Subsequently, the controller 42 determines whether the controller 42 has detected the end of the ballistic trajectory Bt in step S55. When the controller 42 has not detected the end of the ballistic trajectory Bt (NO), the controller 42 (the chair controller 4201) repeats the processing of steps S54 and S55. When the controller 42 has detected the end of the ballistic trajectory Bt (YES), the chair controller 4201 returns the forward tilt of the VR chair 46 to the reference angle in step S56.

In step S57, the controller 42 determines whether to stop receiving the image data from the image transmission server 31. When the controller 42 determines not to stop receiving the image data (NO), the controller 42 (the chair controller 4201) repeats the processing of steps S51 to S57. When the controller 42 determines to stop receiving the image data (YES), the controller 42 terminates the process.

According to a fifth embodiment described above, the VR image display system 40 provides the user Us with a sense of presence equivalent to the sensation that occupants of the vehicle 10 experience when the vehicle 10 proceeds along the ballistic trajectory Bt, in addition to the effects of a first embodiment.

Sixth Embodiment

In second, third, and fifth embodiments, the angles θ2, θ3, and θ5 to θ10 are set according to the accelerations detected by the accelerometer 13. The accelerometer 13 sometimes detects abnormal accelerations when the vehicle 10 moves abnormally or has an accident. In such a case, it is not preferred that the angles θ2, θ3, and θ5 to θ10 are set according to accelerations detected by the accelerometer 13.

Figure 19:
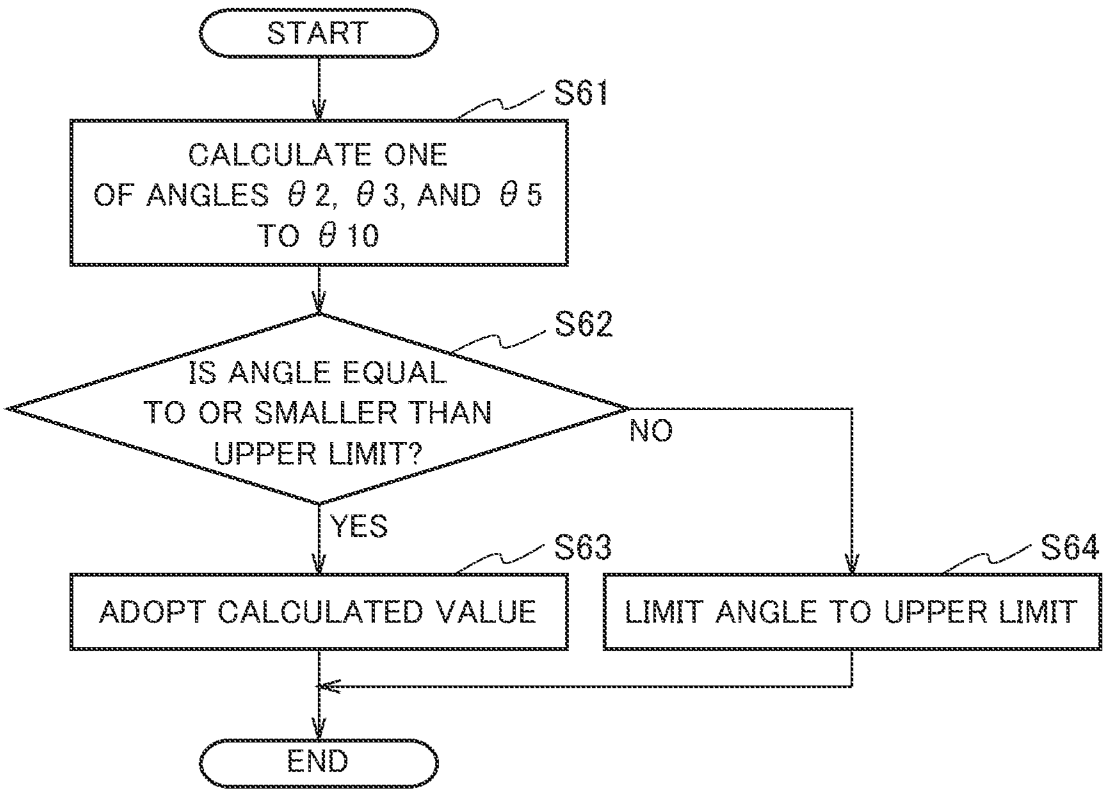
FIG. 19 is a flowchart illustrating a process executed by the image adjustment device and virtual reality image display system according to a sixth embodiment.

In a sixth embodiment, the process illustrated in the flowchart of FIG. 19 is executed in the configurations of second, third, and fifth embodiments. In FIG. 19, the controller 42 calculates any one of the angles θ2, θ3, and θ5 to θ10 in step S61. The controller 42 previously includes upper limits for the respective angles θ2, θ3, and θ5 to θ10. In step S62, the controller 42 determines whether the value calculated in step S61 is equal to or smaller than the corresponding upper limit.

When the value calculated in step S61 is equal to or smaller than the corresponding upper limit (YES), the controller 42 adopts the calculated value and terminates the process in step S63. When the angle calculated in step S61 is not equal to or smaller than the upper limit (NO in step S62), the controller 42 limits the angle to the upper limit and terminates the process in step S64.

The aforementioned process sets the upper limits for the angles θ2, θ3, and θ5 to θ10. However, in addition to the upper limits for these angles, the process may set upper limits for angular velocities to limit the angular velocities to the upper limits. It is particularly preferred that the angular velocities at tilting the VR chair 46 sideways, forward, or rearward are limited to the upper limits.

Figure 20:
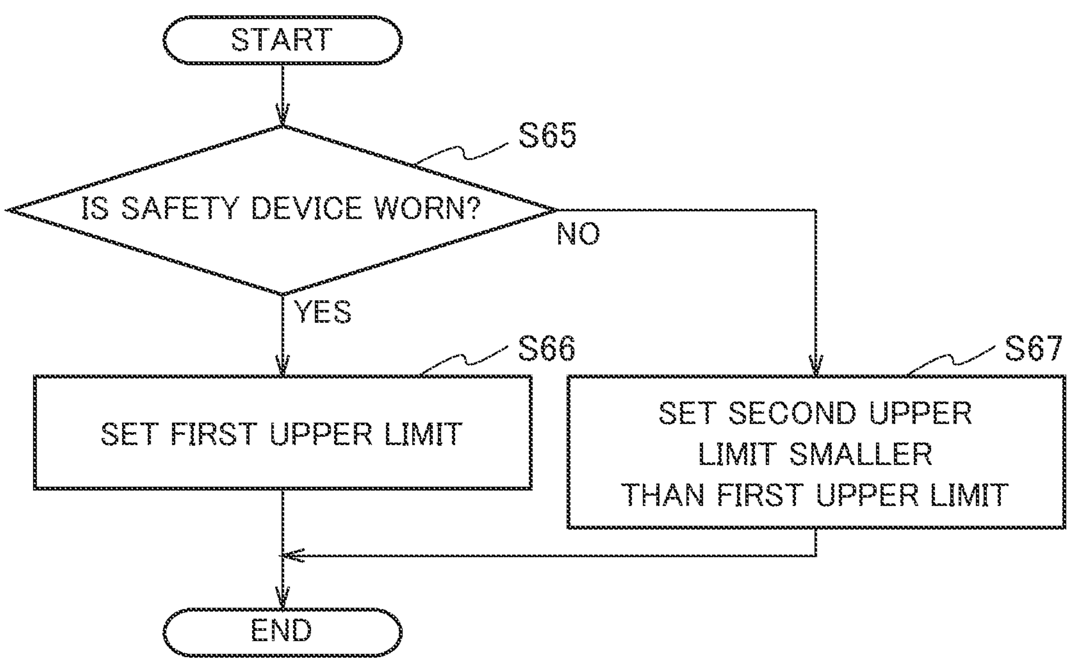
FIG. 20 is a flowchart illustrating a preferable process executed by the image adjustment device and virtual reality image display system according to a sixth embodiment.

The upper limit used in step S62 in FIG. 19 may be set differently depending on whether the user Us wears a safety device, such as the seatbelt 461. As illustrated in the flowchart of FIG. 20, the controller 42 determines whether the user Us wears a safety device in step S65. When the user Us wears the safety device (YES), the controller 42 sets a first upper limit and terminates the process in step S66.

When the user Us does not wear the safety device in step S65 (NO), the controller 42 sets a second upper limit, which is smaller than the first upper limit, in step S67 and terminates the process.

In a sixth embodiment, as described above, the chair controller 4201 controls the VR chair 46 to tilt the VR chair 46 sideways, forward, or rearward according to the acceleration detection signal. When the value of the angle by which the VR chair 46 is to be tilted and which is calculated according to the acceleration detection signal, is equal to or smaller than the predetermined upper limit, the chair controller 4201 tilts the VR chair 46 by the calculated value. When the calculated value is greater than the predetermined upper limit, the chair controller 4201 tilts the VR chair 46 to the predetermined upper limit.

Specifically, when the acceleration detection signal indicates that the moving body is turning left, the chair controller 4201 tilts the VR chair 46 to the right by a predetermined angle. When the acceleration detection signal indicates that the moving body is turning right, the chair controller 4201 tilts the VR chair 46 to the left by a predetermined angle.

With such control for the VR chair 46, the image tilting unit 426 preferably tilts the region image 44*i* to be supplied to the head-mounted display 44, to the right by a predetermined angle. When the acceleration detection signal indicates that the moving body is turning right, the image tilting unit 426 preferably tilts the region image 44*i* to be supplied to the head-mounted display 44, to the left by a predetermined angle.

In this process, when the value of the angle by which the region image 44*i* is to be tilted and is calculated according to the acceleration detection signal is equal to or smaller than the predetermined upper limit, the image tilting unit 426 tilts the region image 44*i* by the calculated value. When the calculated value is greater than the predetermined upper limit, the image tilting unit 426 tilts the region image 44*i* by the predetermined upper limit.

When the acceleration detection signal indicates that the moving body moving forward is accelerating, the chair controller 4201 preferably tilts the VR chair 46 rearward to a predetermined angle. When the acceleration detection signal indicates that the moving body moving forward is decelerating, the chair controller 4201 preferably tilts the VR chair 46 forward to a predetermined angle.

With such control for the VR chair 46, when the acceleration detection signal indicates that the moving body moving forward is accelerating, the region image extractor 425 preferably extracts the region image 44*i* rotated upward by a predetermined angle from the previous region image 44*i* and supplies the newly extracted region image 44*i* to the head-mounted display 44. When the acceleration detection signal indicates that the moving body moving forward is decelerating, the region image extractor 425 preferably extracts the region image 44*i* rotated downward by a predetermined angle from the previous region image 44*i* and supplies the newly extracted region image 44*i* to the head-mounted display 44.

In this process, when the value of the angle by which the region image 44*i* is to be rotated upward or downward from the previous region image 44*i* and which is calculated according to the acceleration detection signal, is equal to or smaller than the predetermined upper limit, the region image extractor 425 preferably extracts the region image 44*i* rotated upward or downward by the calculated value from the previous region image 44*i*. When the calculated value is greater than the predetermined upper limit, the region image extractor 425 preferably extracts the region image 44*i* rotated upward or downward by the upper limit from the previous region image 44*i*.

When the acceleration detection signal indicates that the moving body has started proceeding along the ballistic trajectory Bt, the chair controller 4201 preferably controls the VR chair 46 positioned at the reference angle to tilt the VR chair 46 rearward. When the acceleration detection signal indicates that the moving body has passed the peak Btp, the chair controller 4201 preferably controls the VR chair 46 to tilt the VR chair 46 forward. When the acceleration detection signal indicates that the moving body terminates proceeding along the ballistic trajectory Bt, the chair controller 4201 preferably controls the VR chair 46 to return the VR chair 46 to the reference angle.

According to a sixth embodiment, the VR image display system 40 has improved safety in addition to the effects of second, third, and fifth embodiments.

The present invention is not limited to first to sixth embodiments described above, and can be variously changed without departing from the scope of the present invention.

What is claimed is:

1. An image adjustment device comprising:

an image generator configured to generate a sphere image;

a region image extractor configured to extract a region image according to a direction a user wearing a head-mounted display is facing, from an omnidirectional image of a subject captured with an omnidirectional camera disposed on a moving body or a superimposed image obtained by superimposing the sphere image on the omnidirectional image, and to supply the extracted region image to the head-mounted display;

an image rotation unit configured to correct the tilt of a horizontal plane of the omnidirectional image by rotating the omnidirectional image through an operation to rotate the sphere image while the region image of the superimposed image extracted by the region image extractor is displayed on the head-mounted display;

a vanishing point detector configured to detect a vanishing point of the omnidirectional image when the moving body is moving and the omnidirectional image is changing; and a front setting unit configured to determine the front of the omnidirectional image based on the vanishing point, and to rotate the omnidirectional image while maintaining the horizontal plane corrected by the image rotation unit so that the front of the omnidirectional image corresponds to the region image extracted when the user is facing forward.

2. The image adjustment device according to claim 1, further comprising an image tilting unit configured to tilt the region image to be supplied to the head-mounted display to the right by a predetermined angle when the moving body turns left and tilts the region image to be supplied to the head-mounted display to the left by a predetermined angle when the moving body turns right.

3. The image adjustment device according to claim 1, wherein when the moving body moving forward accelerates, the region image extractor extracts a region image rotated upward by a predetermined angle and supplies the extracted region image to the head-mounted display, and when the moving body moving forward decelerates, the region image extractor extracts a region image rotated downward by a predetermined angle and supplies the extracted region image to the head-mounted display.

4. A virtual reality image display system comprising:

a communication unit configured to receive from an image transmission server image data of an omnidirectional image of a subject captured with an omnidirectional camera disposed on a moving body and an acceleration detection signal detected by an accelerometer attached to the moving body or the omnidirectional camera;

a head-mounted display which is worn on the head of a user, and configured to display the omnidirectional image to the user;

a controller which is operated by the user;

a chair in which the user sits;

an image generator configured to generate a sphere image;

an image superimposition unit configured to superimpose the sphere image on the omnidirectional image to generate a superimposed image;

a region image extractor configured to extract a region image from the omnidirectional image or the superimposed image according to a direction the user is facing, and to supply the extracted region image to the head-mounted display;

an image rotation unit configured to correct the tilt of the horizontal plane of the omnidirectional image by rotating the superimposed image through the user operating the controller to rotate the sphere image while sitting in the chair;

a vanishing point detector configured to detect a vanishing point of the omnidirectional image when the moving body is moving and the omnidirectional image is changing; and a front setting unit configured to determine the front of the omnidirectional image based on the vanishing point, and to rotate the omnidirectional image while maintaining the horizontal plane corrected by the image rotation unit so that the front of the omnidirectional image corresponds to the region image extracted when the user is facing forward.

5. The virtual reality image display system according to claim 4, further comprising a chair controller configured to control movement of the chair.

6. The virtual reality image display system according to claim 5, wherein the chair controller tilts the chair by a predetermined angle to the right when the acceleration detection signal indicates that the moving body is turning left and tilts the chair by a predetermined angle to the left when the acceleration detection signal indicates that the moving body is turning right.

7. The virtual reality image display system according to claim 4, further comprising:

an image tilting unit configured to tilt the region image to be supplied to the head-mounted display, by a predetermined angle to the right when the acceleration detection signal indicates that the moving body is turning left, and to tilt the region image to be supplied to the head-mounted display, by a predetermined angle to the left when the acceleration detection signal indicates that the moving body is turning right.

8. The virtual reality image display system according to claim 4, wherein the controller is a glove-type controller worn on the user's hand, and the image rotation unit rotates the superimposed image in response to an operation of the user virtually situated within the sphere image to rotate the sphere image with the glove-type controller.

9. The virtual reality image display system according to claim 5, wherein the chair controller tilts rearward the chair by a predetermined angle when the acceleration detection signal indicates that the moving body moving forward is accelerating and tilts the chair forward by a predetermined angle when the acceleration detection signal indicates that the moving body moving forward is decelerating.

10. The virtual reality image display system according to claim 4, wherein the region image extractor extracts the region image rotated upward by a predetermined angle when the moving body moving forward accelerates, and extracts the region image rotated downward by a predetermined angle when the moving body moving forward decelerates.

11. The virtual reality image display system according to claim 5, wherein the chair controller controls the chair to lower the chair by a predetermined height from a reference height and then return the chair to the reference height when the acceleration detection signal indicates that the moving body has started proceeding along a ballistic trajectory, and to raise the chair by a predetermined height from the reference height and then return the chair to the reference height when the acceleration detection signal indicates that the moving body completes proceeding along the ballistic trajectory.

12. The virtual reality image display system according to claim 5, wherein the chair controller controls the chair to tilt rearward the chair having been positioned at a reference angle when the acceleration detection signal indicates that the moving body has started proceeding along a ballistic trajectory; to tilt the chair forward when the acceleration detection signal indicates that the moving body has passed the peak of the ballistic trajectory; and to return the chair to the reference angle when the acceleration detection signal indicates that the moving body has completed proceeding along the ballistic trajectory.

13. The virtual reality image display system according to claim 5, wherein the chair controller controls the chair to tilt the chair sideways, forward, or rearward according to the acceleration detection signal, when the value of an angle by which the chair is to be tilted and which is calculated according to the acceleration detection signal is equal to or smaller than a predetermined upper limit, the chair controller tilts the chair by the calculated value and, when the calculated value is greater than the predetermined upper limit, the chair controller tilts the chair by the predetermined upper limit.

14. An image adjustment method comprising:

generating a sphere image;

extracting a region image according to a direction a user wearing a head-mounted display faces, from an omnidirectional image of a subject captured with an omnidirectional camera disposed on a moving body or a superimposed image obtained by superimposing the sphere image on the omnidirectional image, and supplying the extracted region image to the head-mounted display;

correcting the tilt of the horizontal plane of the omnidirectional image by rotating the omnidirectional image through an operation to rotate the sphere image while displaying the extracted region image of the superimposed image on the head-mounted display;

detecting a vanishing point of the omnidirectional image when the moving body is moving and the omnidirectional image is changing; and determining the front of the omnidirectional image based on the vanishing point and rotating the omnidirectional image while maintaining the corrected horizontal plane so that the front of the omnidirectional image corresponds to the region image extracted when the user is facing forward.

15. The image adjustment method according to claim 14, wherein the region image to be supplied to the head-mounted display is tilted by a predetermined angle to the right when the moving body turns left, and is tilted by a predetermined angle to the left when the moving body turns right.

16. The image adjustment method according to claim 14, wherein when the moving body moving forward accelerates, the region image rotated upward by a predetermined angle is extracted and is supplied to the head-mounted display, and when the moving body moving forward decelerates, the region image rotated downward by a predetermined angle is extracted and is supplied to the head-mounted display.

* * * * *